(12) United States Patent
Terada

(10) Patent No.: US 7,180,682 B1
(45) Date of Patent: Feb. 20, 2007

(54) VARIABLE-MAGNIFICATION OPTICAL SYSTEM AND IMAGE TAKING APPARATUS

(75) Inventor: Mamoru Terada, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/321,938

(22) Filed: Dec. 29, 2005

(30) Foreign Application Priority Data

Sep. 15, 2005 (JP) ............................. 2005-267874

(51) Int. Cl.
*G02B 15/14* (2006.01)

(52) U.S. Cl. ............. 359/687; 359/683; 359/684; 359/726; 359/715; 359/740; 359/774

(58) Field of Classification Search ........ 359/676–687, 359/740, 726, 713–715, 774
See application file for complete search history.

(56) References Cited

U.S. PATENT DOCUMENTS 5,585,969 A * 12/1996 Endo ..................... 359/683
5,815,321 A * 9/1998 Shimo ..................... 359/687
5,835,286 A * 11/1998 Yamanashi ................ 359/787
5,847,882 A * 12/1998 Nakayama ................ 359/684
5,872,659 A * 2/1999 Kohno ..................... 359/683
5,978,150 A * 11/1999 Hamanishi et al. ......... 359/683
6,094,312 A * 7/2000 Nakayama ................ 359/676

FOREIGN PATENT DOCUMENTS

| JP | 08211289 A | * | 8/1996 | .............. 359/687 |
| JP | 2000-187159 A | | 7/2000 | |
| JP | 2002-169088 A | | 6/2002 | |

\* cited by examiner

Primary Examiner—Evelyn A. Lester
(74) Attorney, Agent, or Firm—Sidley Austin LLP

(57) ABSTRACT

A variable-magnification optical system has a plurality of lens groups that image a light beam from the object side on an image sensor, an optical aperture stop that intercepts part of the light beam heading for the image sensor, and a reflective mirror that changes the optical axis of the light beam of which part has been intercepted by the optical aperture stop. The plurality of lens groups include at least lens groups arranged in a positive-negative-positive-positive optical power arrangement, and at least two of the lens groups are moved for zooming from the wide-angle end to the telephoto end. The variable-magnification optical system fulfills a prescribed conditional formula.

18 Claims, 8 Drawing Sheets

WIDE FNO=2.88

SPHERICAL SINE
ABERRATION CONDITION

WIDE Y'=3.6

ASTIGMATISM

WIDE Y'=3.6

DISTORTION

MIDDLE FNO=4.03

SPHERICAL SINE
ABERRATION CONDITION

MIDDLE Y'=3.6

ASTIGMATISM

MIDDLE Y'=3.6

DISTORTION

TELEPHOTO FNO=4.60

SPHERICAL SINE
ABERRATION CONDITION

TELEPHOTO Y'=3.6

ASTIGMATISM

TELEPHOTO Y'=3.6

DISTORTION

WIDE FNO=2.88
—— d
— — g
- - - SC
-0.2  0.2
SPHERICAL SINE
ABERRATION CONDITION

WIDE Y'=3.6
- - - - DM
—— DS
-0.2  0.2
ASTIGMATISM

WIDE Y'=3.6
-5.0  5.0
DISTORTION

MIDDLE FNO=3.96
—— d
— — g
- - - SC
-0.2  0.2
SPHERICAL SINE
ABERRATION CONDITION

MIDDLE Y'=3.6
- - - - DM
—— DS
-0.2  0.2
ASTIGMATISM

MIDDLE Y'=3.6
-5.0  5.0
DISTORTION

TELEPHOTO FNO=4.79
—— d
— — g
- - - SC
-0.2  0.2
SPHERICAL SINE
ABERRATION CONDITION

TELEPHOTO Y'=3.6
- - - - DM
—— DS
-0.2  0.2
ASTIGMATISM

TELEPHOTO Y'=3.6
-5.0  5.0
DISTORTION

VARIABLE-MAGNIFICATION OPTICAL SYSTEM AND IMAGE TAKING APPARATUS

This application is based on Japanese Patent Application No. 2005-267874 filed on Sep. 15, 2005, the contents of which are hereby incorporated by reference.

BACKGROUND OF THE INVENTION

1. Field of the Invention

The present invention relates to a variable-magnification optical system for use in a lens unit or the like, and also relates to an image-taking apparatus incorporating such a variable-magnification optical system.

2. Description of Related Art

In recent years, as personal computers (PC) become widespread, digital still cameras (image-taking apparatuses), which permit easy capturing of images, have been becoming increasingly popular. In such digital still cameras (DSCs), as in cameras using silver-halide film (silver-halide cameras), compactness (slimness) and high performance (for example, a high magnification variation ratio and high aberration correction performance) are sought. Accordingly, compactness and high performance are sought in lens optical systems (for example, variable-magnification optical systems) incorporated in digital still cameras.

To meet such requirements, there have been developed lens optical systems whose total length is shortened by the use of an optical prism or a reflective mirror that bends the light beam traveling from object side to image side (as proposed in, for example, Patent Publications 1 and 2 listed below). The thus shortened total length permits such a lens optical system to be properly arranged within the limited space inside the housing of a DSC. This helps make the housing, and thus the DSC as a whole, compact and slim.

Patent Publication 1: Japanese Patent Application Laid-open No. 2002-169088 (laid-open on Jun. 14, 2002)

Patent Publication 2: Japanese Patent Application Laid-open No. 2000-187159 (laid-open on Jul. 4, 2000)

Certainly, the lens optical systems proposed in Patent Publications 1 and 2 are compact. These, however, are designed to offer zoom ratios of 7× to 10×, and therefore do not offer satisfactorily high performance.

SUMMARY OF THE INVENTION

In view of the conventionally encountered inconvenience mentioned above, it is an object of the present invention to provide a compact high-performance variable-magnification optical system, and to provide an image-taking apparatus incorporating such a variable-magnification optical system.

To achieve the above object, according to one aspect of the present invention, a variable-magnification optical system is provided with: a plurality of lens groups that image a light beam from the object side on an image sensor; an optical aperture stop that intercepts part of the light beam heading for the image sensor; and an optical axis changing element that changes the optical axis of the light beam of which part has been intercepted by the optical aperture stop.

Here, the plurality of lens groups include, from the object side to the image side, at least: a first lens group having a positive optical power; a second lens group having a negative optical power; a third lens group having a positive optical power; and a fourth lens group having a positive optical power. In this variable-magnification optical system, for magnification variation from a wide-angle end to a telephoto end, at least two of the lens groups are moved.

In the variable-magnification optical system constructed as described above, for reasons related to its optical power arrangement, the optical aperture stop is typically disposed near the third lens group. Then, the optical axis changing element that changes (for example, bends) the optical axis of the light beam of which part has been intercepted is disposed to the image side of the optical aperture stop. As a result, as compared with a variable-magnification optical system that extends in one direction (that is, a straight optical system), the variable-magnification optical system according to the present invention is more compact in that direction by the length of the lens groups disposed on the downstream side of where the optical axis is bent.

When the thus shortened variable-magnification optical system is incorporated in an image-taking apparatus, the lens groups disposed to the image side of the optical axis changing element can easily be built in the chassis (body) of the image-taking apparatus. Thus, as compared with an image-taking apparatus incorporating a straight optical system, the image-taking apparatus according to the present invention is more compact, for example, in the depth direction.

Since the beam size is smaller on the image side than on the object side, the optical axis changing element that changes the optical axis when the beam size is small can be comparatively compact. Thus, simply through the inclusion of the comparatively compact optical axis changing element, the variable-magnification optical system according to the present invention permits part of its lens groups to be properly built in the limited space inside the housing of an image-taking apparatus.

In the variable-magnification optical system according to the present invention, it is preferable that conditional formula (1) below be fulfilled:

$$1.1 < \beta 3t/\beta 3w < 5.0 \tag{1}$$

where $\beta 3t$ represents the horizontal magnification of the third lens group at the telephoto end; and $\beta 3w$ represents the horizontal magnification of the third lens group at the wide-angle end.

Conditional formula (1) defines a preferable range of the magnification variation ratio of the third lens group. Within that range, the responsibility for magnification variation can be properly distributed between, for example the second and third lens groups. Hence, within the range defined by conditional formula (1), no lens group is excessively responsible for magnification variation. Thus, it is possible to alleviate the disadvantages resulting from excessive responsibility for magnification variation, namely the aggravation of aberrations and the increase of the movement strokes of the lens groups. Thus, according to the present invention, it is possible to realize a compact variable-magnification optical system while reducing (correcting) various aberrations.

As described above, according to the present invention, the magnification variation ratio of the third lens group can be set in a proper range. Thus, the responsibility for magnification variation can be properly distributed between, for example the second and third lens groups. Thus, it is possible to realize a compact variable-magnification optical system while reducing (correcting) the various aberrations provided by the individual lens groups. Moreover, by incorporating such a variable-magnification optical system in an image-taking apparatus, it is possible to realize a compact high-performance image-taking apparatus.

The above and other objects and features of the present invention will be made clearer by way of preferred embodiments described below with reference to the accompanying drawings.

DETAILED DESCRIPTION OF PREFERRED EMBODIMENTS

First Embodiment

An embodiment of the present invention will be described below with reference to the drawings.

1. Digital Still Camera

Figure 7:
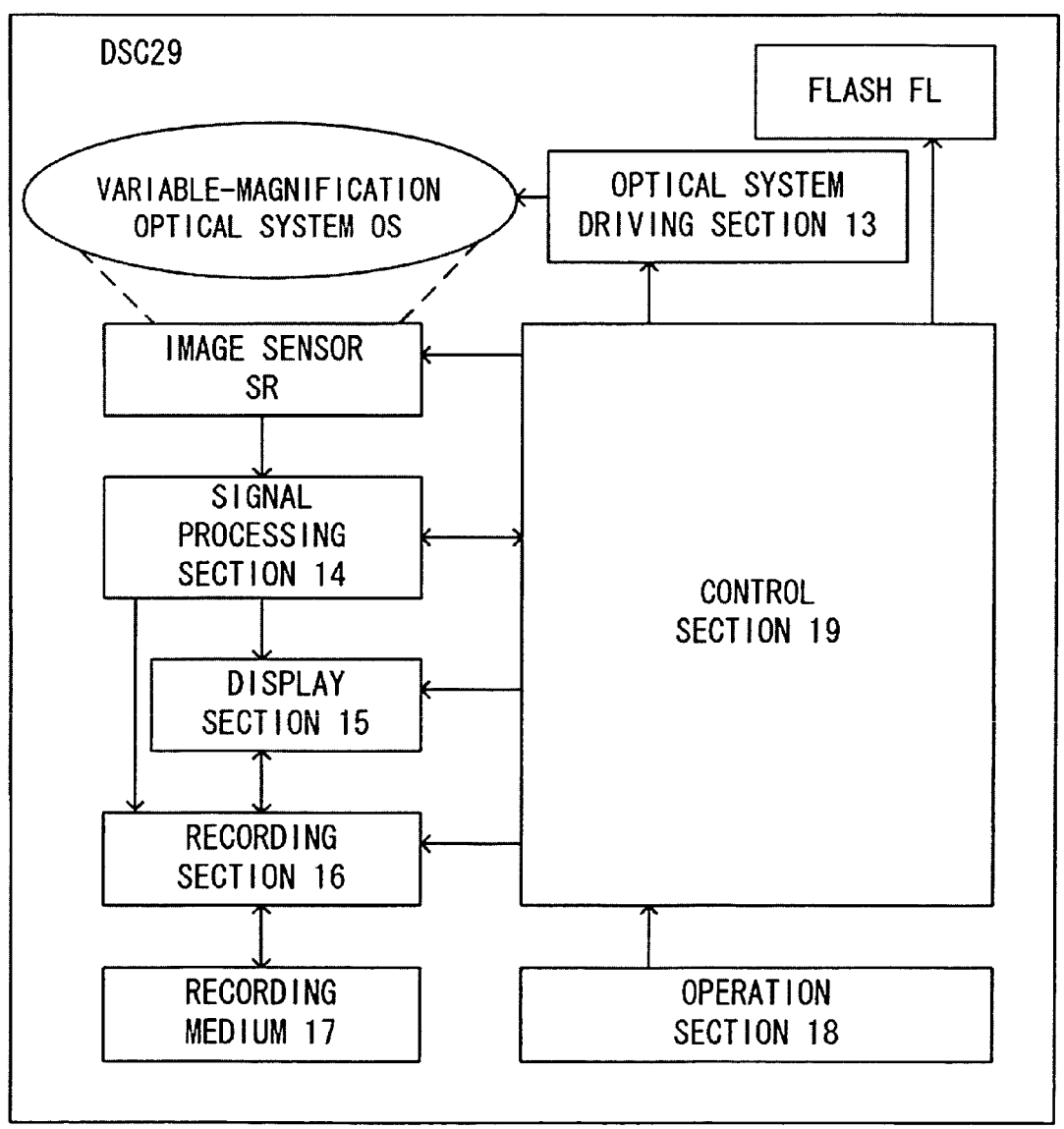
FIG. 7 is a block diagram showing the internal configuration of a DSC according to the invention.

FIG. 7 is a block diagram showing the internal configuration of a digital still camera (DSC) 29 as an example of an image-taking apparatus according to the present invention.

As shown in FIG. 7, the DSC 29 includes a variable-magnification optical system OS, a flash FL, an optical system driving section 13, an image sensor SR, a signal processing section 14, a display section 15, a recording section 16, a recording medium 17, an operation section 18, and a control section 19.

The variable-magnification optical system OS directs the light from the shooting target (subject, object) to the image sensor SR, and meanwhile images the light on the photosensitive surface (image surface) of the image sensor SR. Thus, the variable-magnification optical system OS may also be called an imaging optical system or an image-taking optical system. The variable-magnification optical system OS will be described in detail later.

The flash FL shines light at the subject, and thereby increases the light (reflected) from the subject to ease the image sensing by the image sensor SR.

The optical system driving section 13 includes several drive motors (optical system drive motors) and transmission mechanisms (optical system transmission mechanisms) that transmit the driving forces of those drive motors to the lens groups constituting the variable-magnification optical system OS (the drive motors and the transmission mechanisms are omitted from illustration). By using the drive motors and the transmission mechanisms, the optical system driving section 13 sets the focal length and the focus position of the variable-magnification optical system OS. Specifically, according to instructions from the control section 19, the optical system driving section 13 sets the focal length and the focus position.

Used as the image sensor SR is, for example, a CCD (charge-coupled device) area sensor or a CMOS (complementary metal-oxide-semiconductor) sensor. The image sensor SR receives the light having passed through the variable-magnification optical system OS, and converts it into an electrical data (sensed data). The image sensor SR then feeds the sensed data to the signal processing section 14.

The signal processing section 14 processes the electronic data (sensed data) from the image sensor SR, and thereby produces sensed-image data based on the sensed data. According to instructions from the control section 19, the signal processing section 14 starts and stops its processing. Moreover, according to instructions from the control section 19, the signal processing section 14 feeds the sensed-image data to the display section 15 and to the recording section 16.

Used as the display section 15 is, for example, a liquid crystal panel. The display section 15 displays images reproduced from the sensed-image data from the signal processing section 14, and also displays the operation status of the DSC 29.

According to instructions from the control section 19, the recording section 16 records the sensed-image data produced by the signal processing section 14 to the recording medium 17. Moreover, according to instructions from the control section 19 in response to operations performed on the operation section 18 and the like, the recording section 16 reads sensed-image data from the recording medium 17.

The recording medium 17 may be incorporated in the DSC 29, or may be removable therefrom in the form of a flash memory or the like. What matters here is that the recording medium 17 is a medium (such as an optical disk or a semiconductor memory) that can store sensed-image data and the like.

The operation section 18 feeds instructions based on operations performed thereon by the user or the like to the control section 19. The operation section 18 includes, for example, a shutter release button and an operation dial.

The control section 19 is the nerve center of the DSC 29, controlling the overall operation thereof and otherwise governing it. The control section 19 controls the operation of different parts of the DSC 29 in an organized manner and thereby controls it in a centralized manner.

2. Variable-Magnification Optical System

Figure 1:
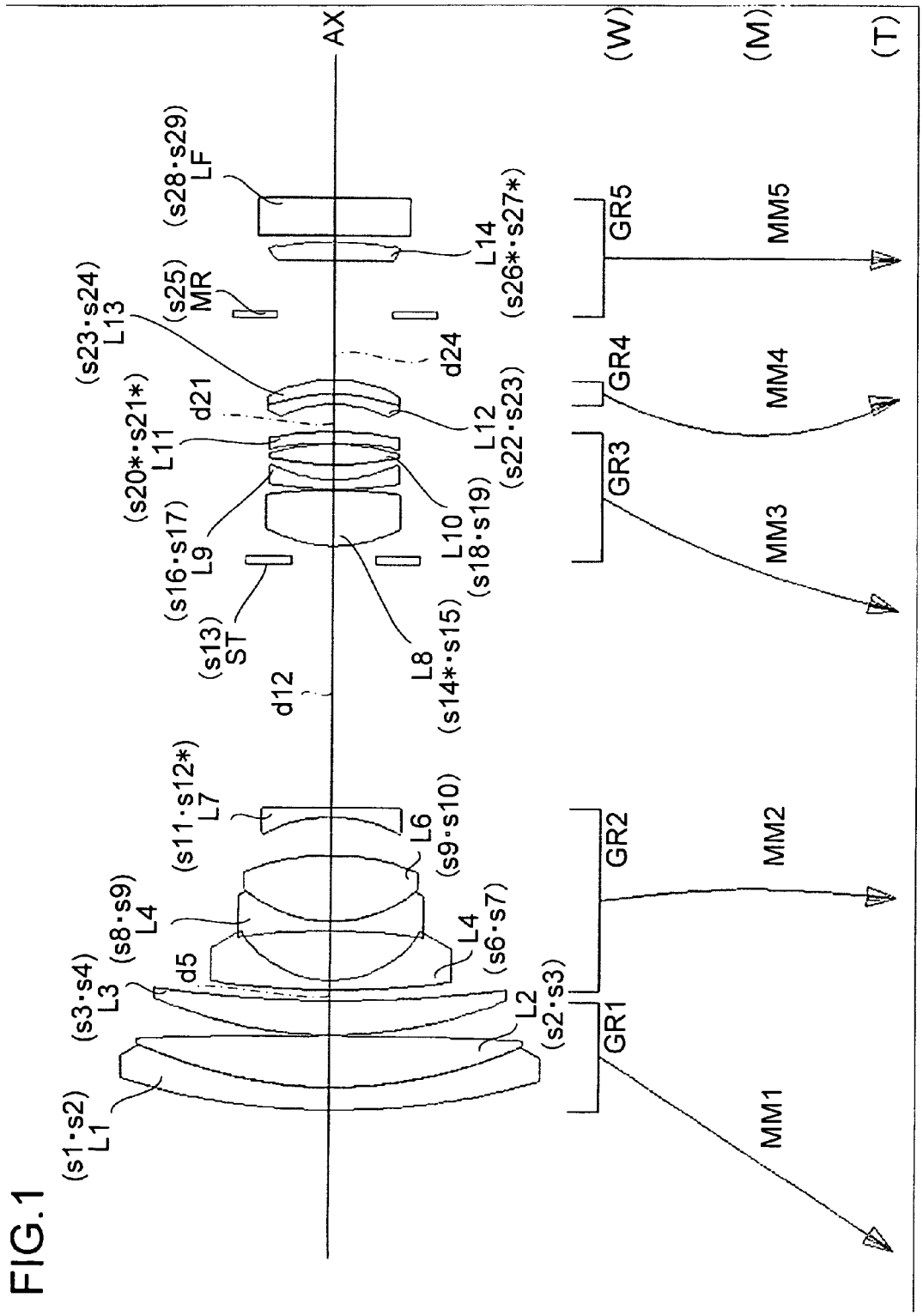
FIG. 1 is a lens construction diagram showing the variable-magnification optical system of Example 1, in its state developed along a straight line.

Now, the variable-magnification optical system OS will be described with reference to FIGS. 1 and 2. FIG. 1 is a lens construction diagram showing the variable-magnification optical system OS, in its state developed along a straight line. On the other hand, FIG. 2 is a lens construction diagram showing the variable-magnification optical system OS and the image sensor SR, in their state actually built in the DSC 19.

Figure 2:
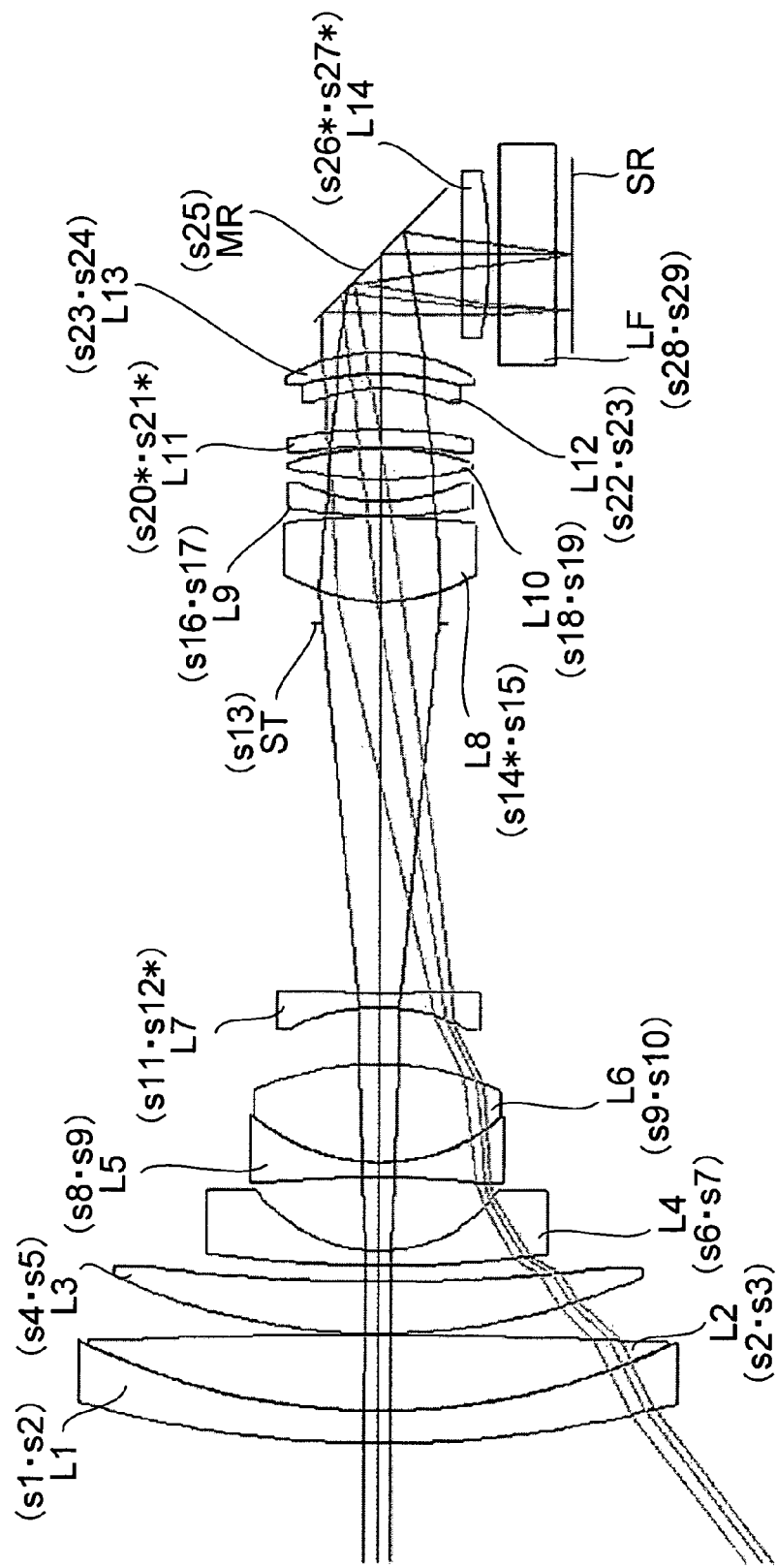
FIG. 2 is a lens construction diagram showing the variable-magnification optical system of Example 1 and an image sensor, in their state actually built in an image-taking apparatus (DSC) according to the present invention.

In FIGS. 1 and 2, a symbol in the form of "GRi" (where i=1, 2, 3, . . . ) represents a lens group, a symbol in the form of "Li" (where i=1, 2, 3, . . . ) represents a lens element, and a symbol in the form of "si" (where i=1, 2, 3, . . . ) represents a lens surface (such as transmissive surface). The number "i" suffixed to any of these symbols "GRi", "Li", and "si" represents the order, among the elements of the same kind, as counted from the object side to the image side. An aspherical surface is marked with an asterisk "*". The variable-magnification optical system OS shown in FIGS. 1 and 2 will be referred to as Example 1.

2-1. Construction of the Variable-Magnification Optical System (Example 1)

The variable-magnification optical system OS includes, from the shooting target (object) side, a first lens group GR1, a second lens group GR2, a third lens group GR3, a fourth lens group GR4, and a fifth lens group GR5.

2-1-1. First Lens Group

The first lens group GR1 includes, from the object side, a first lens element L1, a second lens element L2, and a third lens element L3. The first lens group GR1 as a whole has a "positive" optical power (refractive power). Incidentally, the optical power is a quantity defined as the reciprocal of the focal length.

Used as the lens elements are:
The first lens element L1: a negative meniscus lens element convex to the object side;
The second lens element L2: a biconvex positive lens element; and
The third lens element L3: a positive meniscus lens element convex to the object side.

Here, the first and second lens elements L1 and L2 are cemented together at the surface s2, and are thereby formed into a cemented lens element. The cementing together of these lens elements is achieved, for example, with adhesive (likewise, the other cemented lens elements mentioned later are also formed through cementing together of their component lens elements, for example, with adhesive).

2-1-2. Second Lens Group

The second lens group GR2 includes, from the object side, a fourth lens element L4, a fifth lens element L5, a sixth lens element L6, and a seventh lens element L7. The second lens group GR2 as a whole has a "negative" optical power.

Used as the lens elements are:
The fourth lens element L4: a negative meniscus lens element convex to the object side;
The fifth lens element L5: a biconcave negative lens element;
The sixth lens element L6: a biconvex positive lens element; and
The seventh lens element L7: a biconcave negative lens element (having an aspherical surface as the surface s12)

Here, the fifth and sixth lens elements L5 and L6 are cemented together at the surface s9, and are thereby formed into a cemented lens element. An aspherical surface is, for example, a refractive optical surface having an aspherical shape, or a surface exerting a refractive effect equivalent to that exerted by an aspherical surface.

2-1-3. Third Lens Group

The third lens group GR3 includes, from the object side, an optical aperture stop ST, an eighth lens element L8, a ninth lens element L9, a tenth lens element L10, and an eleventh lens element L11. The third lens group GR3 as a whole has a "positive" optical power.

Used as the optical aperture stop ST and the lens elements are:
The optical aperture stop ST: an aperture stop that intercepts part of the light beam that has passed through the first and second lens groups GR1 and GR2; also identified as s13; built integrally with the third lens group GR3;
The eighth lens element L8: a biconvex positive lens element (having an aspherical surface as the surface s14);
The ninth lens element L9: a negative meniscus lens element convex to the object side;
The tenth lens element L10: a biconvex positive lens element; and
The eleventh lens element L11: a negative meniscus lens element concave to the object side (having aspherical surfaces as the surfaces s20 and s21).

2-1-4. Fourth Lens Group

The fourth lens group GR4 includes, from the object side, a twelfth lens element L12 and a thirteenth lens element L13. The fourth lens group GR4 as a whole has a "positive" optical power.

Used as the lens elements are:

The twelfth lens element L12: a negative meniscus lens element concave to the object side; and The thirteenth lens element L13: a positive meniscus lens element concave to the object side.

2-1-4. Fifth Lens Group

The fifth lens group GR5 includes, from the object side, a reflective mirror MR, a fourteenth lens element L14, and a low-pass filter LF. The fifth lens group GR5 as a whole has a "positive" optical power.

Used as the reflective mirror MR, the fourteenth lens element L14, and the low-pass filter LF are:

The reflective mirror MR: an optical axis changing element that bends at about 90° the optical axis of the light beam that has passed through the first, second, and third lens groups GR1, GR2, and GR3; built integrally with the fifth lens group GR5;

The fourteenth lens element L14: a negative meniscus lens element concave to the object side (having aspherical surfaces as the surfaces s26 and s27); and The low-pass filter LF: an optical filter having two surfaces (s28 and s29); having a predetermined cut-off frequency characteristic determined by the pixel pitch of the image sensor SR.

To the image side of the low-pass filter LF, the image sensor SR is disposed. The variable-magnification optical system OS and the image sensor SR are collectively referred to as a lens unit.

2-2. Construction Data of the Variable-Magnification Optical System (Example 1)

Next, the construction data of the variable-magnification optical system OS of Example 1 will be explained with reference to Tables 1 and 2.

In Table 1, the symbol "ri" (where i=1, 2, 3, . . . ) represents the radius of curvature (in mm) of the surface si. An aspherical surface is marked with an asterisk "*". The symbol "di" (where i=1, 2, 3, . . . ) represents the axial distance (in mm) between the ith surface si and the (i+1)th surface si+1. For an axial distance that varies with zooming (that is, a group-to-group distance), three values of di are given, namely, from left, the value of di observed at the wide-angle end W, that observed at the middle-focal-length position M, and that observed at the telephoto end T.

The symbols "Ni" (where i=1, 2, 3, . . . ) and "vi" (where i=1, 2, 3, . . . ) represent the refractive index Nd and the Abbe number vd of the medium that fills the axial distance di. Here, the refractive index Nd and the Abbe number vd are for the d-line (having a wavelength of 587.56 nm).

The different "focal length positions" considered in the construction data are: the wide-angle end W (the shortest-focal-length position); the middle-focal-length position M; and the telephoto end T (the longest-focal-length position). The symbols "f" and "FNO" represent the focal length (in mm) and the f-number, respectively, of the entire optical system, for each of which three values are given, namely, those observed at the different focal length positions W, M, and T.

An aspherical surface is defined by formula (AS) below:

$$X(H) = C_0 \cdot H^2 \Big/ \left(1 + \sqrt{1 - \varepsilon \cdot C_0^2 \cdot H^2}\right) + \sum A_j \cdot H^j \quad (AS)$$

where

H represents the height in the direction perpendicular to the optical axis AX;

X(H) represents the displacement along the optical axis (that is, the sag) AX at the height H;

$C_0$ represents the paraxial curvature (=1/ri);

$\varepsilon$ represents a quadric surface parameter;

j represents the order of the aspherical surface; and

Aj represents the aspherical surface coefficient of order j;

Table 2 lists the data related to the aspherical surfaces (aspherical surface data). In Table 2, no terms are listed whose coefficients equal zero, and the notation "E-n" stands for "×10$^{-n}$".

2-3. Movement of the Lens Groups in the Variable-Magnification Optical System Now, the movement of the lens groups GR1 to GR5 will be described with reference to FIG. 1. Usually, the variable-magnification optical system OS achieves zooming (magnification variation) or the like by varying the distances between the lens groups along the optical axis AX. For example, the variable-magnification optical system OS of Example 1, while keeping the fifth lens group GR5 stationary, moves the other lens groups GR1 to GR4.

Thus, during zooming, the distance between the lens groups (the group-to-group distances) vary. Specifically, for zooming from the wide-angle end to the telephoto end, the variable-magnification optical system OS increases the group-to-group distance between the first and second lens groups G1 and G2, decreases the group-to-group distance between the second and third lens groups G2 and G3, increases the group-to-group distance between the third and fourth lens groups G3 and G4, and first increases and then decreases the group-to-group distance between the fourth and fifth lens groups G4 and G5.

In FIG. 1, of all the axial distances di, only those which vary with zooming are indicated, namely d5, d12, d21, and d24. Moreover, in FIG. 1, an arrow "MMi" (where i=1, 2, 3, . . . ) schematically indicates the movement of the lens group GRi from the wide-angle end W through the middle-focal-length position M to the telephoto end T. The number "i" suffixed to the symbol MMi represents the order as counted from the object side to the image side, and thus corresponds to the order of the relevant lens group itself.

Figure 3A:
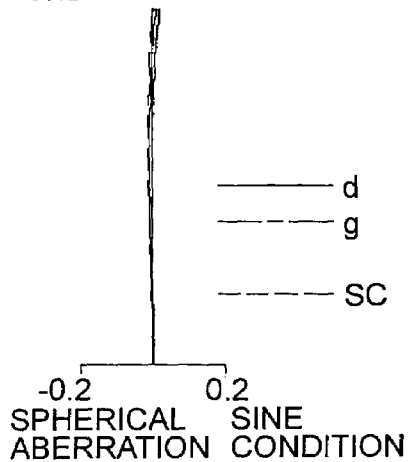
FIG. 3A is a diagram showing the spherical aberration observed in the variable-magnification optical system of Example 1 at the wide-angle end W of zooming.
Figure 3B:
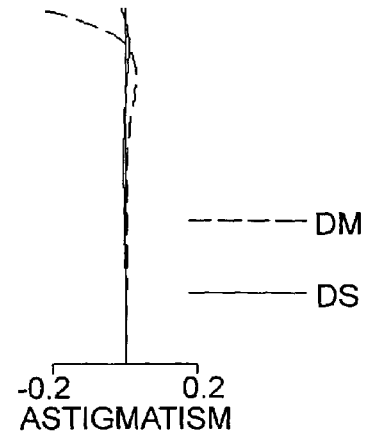
FIG. 3B is a diagram showing the astigmatism observed in the variable-magnification optical system of Example 1 at the wide-angle end W of zooming.
Figure 3C:
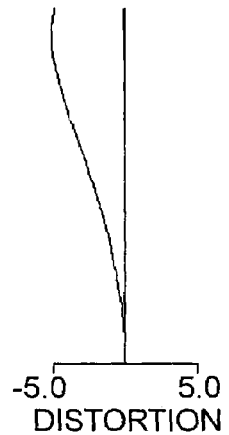
FIG. 3C is a diagram showing the distortion observed in the variable-magnification optical system of Example 1 at the wide-angle end W of zooming.
Figure 4A:
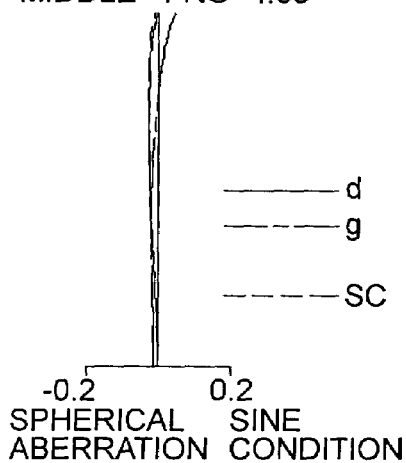
FIG. 4A is a diagram showing the spherical aberration observed in the variable-magnification optical system of Example 1 at the middle-focal-length position M of zooming.
Figure 4B:
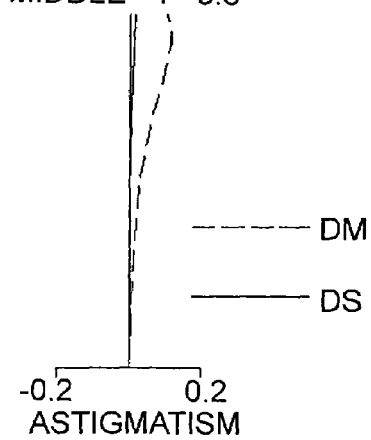
FIG. 4B is a diagram showing the astigmatism observed in the variable-magnification optical system of Example 1 at the middle-focal-length position M of zooming.
Figure 4C:
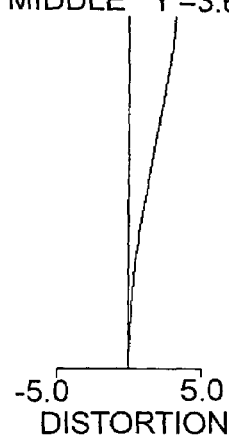
FIG. 4C is a diagram showing the distortion observed in the variable-magnification optical system of Example 1 at the middle-focal-length position M of zooming.
Figure 5A:
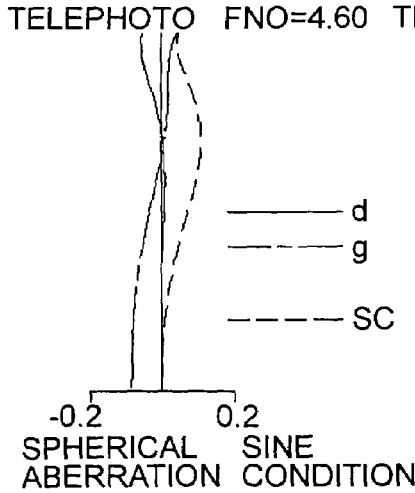
FIG. 5A is a diagram showing the spherical aberration observed in the variable-magnification optical system of Example 1 at the telephoto end T of zooming.
Figure 5B:
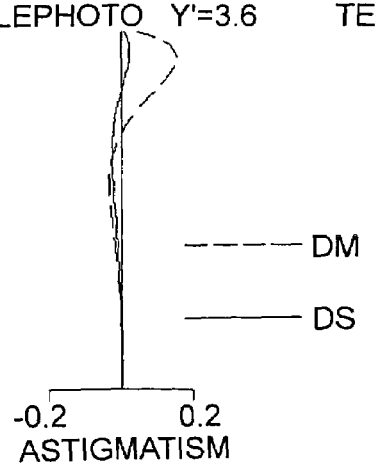
FIG. 5B is a diagram showing the astigmatism observed in the variable-magnification optical system of Example 1 at the telephoto end T of zooming.
Figure 5C:
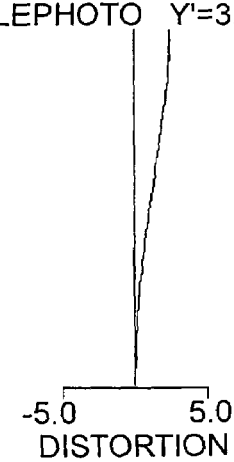
FIG. 5C is a diagram showing the distortion observed in the variable-magnification optical system of Example 1 at the telephoto end T of zooming.

FIGS. 3A to 3C, 4A to 4C, and 5A to 5C show the aberrations observed in the variable-magnification optical system OS at different zoom positions (focal-length positions). More specifically, FIGS. 3A to 3C show the aberrations observed at the wide-angle end W, FIGS. 4A to 4C show the aberrations observed at the middle-focal-length position M, and FIGS. 5A to 5C show the aberrations observed at the telephoto end T.

FIGS. 3A, 4A, and 5A show spherical aberration (S.A.) and sine condition (S.C.), along with the f-number FNO at each zoom position. In these diagrams, the following different types of line are used:

The solid line d: represents the spherical aberration (in mm) observed for the d-line (having a wavelength of 587.6 nm);

The dash-and-dot line g: represents the spherical aberration (in mm) observed for the g-line (having a wavelength of 435.8 nm); and The broken line SC: represents deviations (in mm) from the desired sine condition.

FIGS. 3B, 4B, and 5B show astigmatism, along with the maximum image height Y' (in mm) (the distance from the optical axis AX) on the photosensitive surface of the image sensor SR. In these diagrams, the following different types of line are used:

The broken line DM: represents the astigmatism observed for the d-line on the meridional plane; and The solid line DS: represents the astigmatism observed for the d-line on the sagittal plane.

FIGS. 3C, 4C, and 5C show distortion, along with, also here, the maximum image height Y'. In these diagrams, the solid line represents the distortion (in percentage) observed for the d-line.

3. Examples of Various Features of the Present Invention

As described above, according to one aspect (Example 1) of the present invention, a variable-magnification optical system OS is provided with: a plurality of lens groups that image the light beam from the object side on an image sensor SR; an optical aperture stop ST that intercepts part of the light beam heading for the image sensor SR; and a reflective mirror MR that changes the optical axis of the light beam of which part has been intercepted by the optical aperture stop ST.

The plurality of lens groups include, from the object side to the image side, at least: a first lens group GR1 having a positive optical power; a second lens group GR2 having a negative optical power; a third lens group GR3 having a positive optical power; and a fourth lens group GR4 having a positive optical power. Of these lens groups, at least two (in Example 1, GR1 to GR4) are moved for zooming (magnification variation) from the wide-angle end to the telephoto end.

In the variable-magnification optical system OS constructed as described above, the first to fourth lens groups GR1 to G4 are arranged in a positive-negative-positive-positive optical power arrangement. Thus, for reasons related to this optical power arrangement, an optical aperture stop ST is typically disposed near the third lens group GR3. Accordingly, a reflective mirror MR that reflects the light beam of which part has been intercepted is typically disposed to the image side of the optical aperture stop ST (for example, further to the image side of the third lens group GR3). In the variable-magnification optical system OS of the first embodiment, the optical aperture stop ST is disposed at the most object-side position in the third lens group GR3, and the reflective mirror MR is disposed at the most object-side position in the fifth lens group GR5.

Figure 6A:
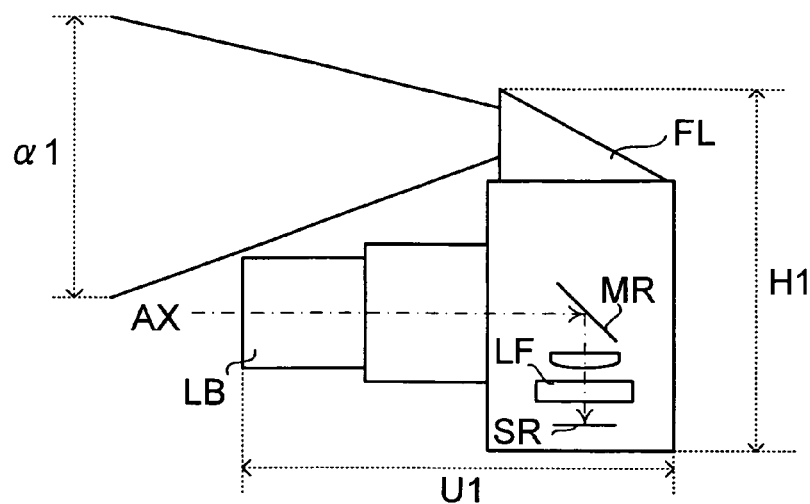
FIG. 6A is a side view of a DSC incorporating a variable-magnification optical system according to the present invention.
Figure 6B:
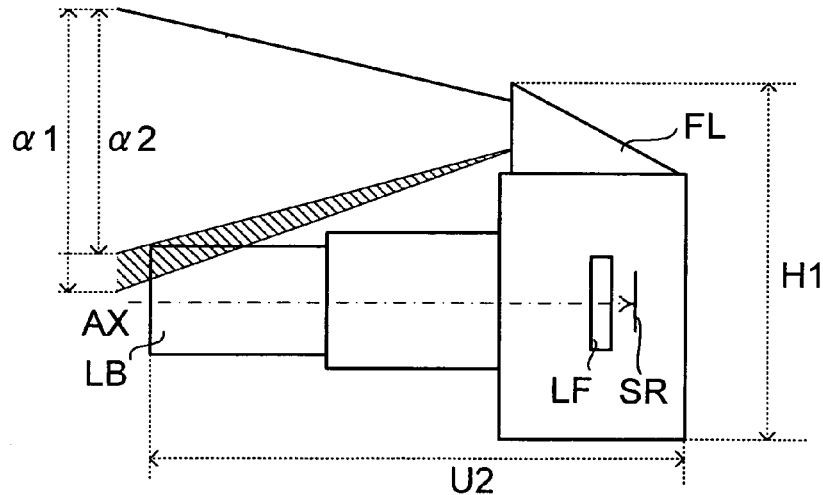
FIG. 6B is a side view of a DSC incorporating a straight optical system.
Figure 6C:
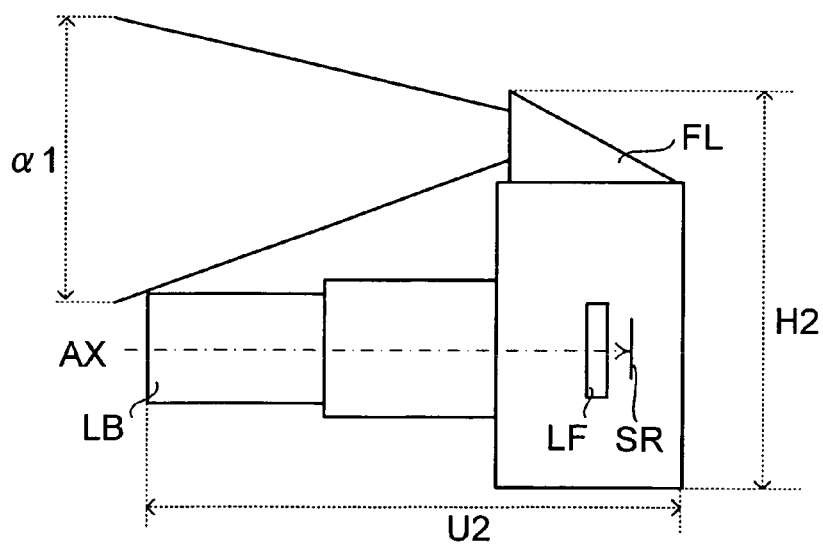
FIG. 6C is a side view of another DSC incorporating a straight optical system.

When the reflective mirror MR is disposed at the most object-side position in the fifth lens group GR5 in this way, as shown in FIG. 6A, the lens elements and the like (L14 and LF) disposed to the image side of the reflective mirror MR can be built inside the body (housing) of a DSC 29 or the like. Then, as shown in FIGS. 6B and 6C, the DSC 29 according to the invention, as compared with a DSC incorporating a variable-magnification optical system offering comparable performance but extending in a straight line (for example, a straight optical system offering the same zoom ratio), has a smaller depth-direction dimension U. That is, the depth-direction dimension U1 of the DSC 29 shown in FIG. 6A is smaller than the depth-direction dimension U2 of the DSCs 29 shown in FIGS. 6B and 6C (U1<U2).

The light beam on the image side (for example, on the downstream side of the optical aperture stop ST) has a smaller beam size than the light beam on the object side. Thus, the reflective mirror MR that reflects the light beam with such a smaller beam size can be comparatively compact. Thus, simply through the inclusion of the comparatively compact reflective mirror MR, the variable-magnification optical system OS according to the present invention permits part of its lens groups to be properly built in the limited space inside the body of the DSC 29 (see FIG. 6A).

As described above, the DSC 29 according to the present invention, by incorporating a variable-magnification optical system (bending optical system) OS shorter than a straight optical system, has a smaller depth-direction dimension U. Thus, in the DSC 29 shown in FIG. 6A, no part of the beam width α1 of flash light FL in interfered by the lens barrel LB as in the DSC 29 shown in FIG. 6B (see the hatched area in FIG. 6B). Incidentally, this phenomenon of flash light FL being interfered by the lens barrel LB included in the variable-magnification optical system OS is called "vignetting" of flash light FL. When flash light FL is vignetted, as shown in FIG. 6B, the beam width α2 in the DSC 29 is smaller than the beam width α1 of flash light FL in the DSC 29 shown in FIG. 6A.

The vignetting of flash light FL can be prevented by moving the flash FL away from the axis of the lens barrel LB (that is, away from the optical axis AX). This, however, increases the height-direction dimension H of the DSC 29 as shown in FIG. 6C. That is, the height H2 of the DSC 29 shown in FIG. 6C is larger than the height H1 of the DSC 29 shown in FIG. 6A (H1<H2). Thus, the variable-magnification optical system OS according to the present invention contributes to the reduction of the height-direction and depth-direction dimensions H and U of the DSC 29.

It is preferable that the variable-magnification optical system OS according to the present invention fulfill one or more of conditional formulae (A) to (E) noted below. These conditional formulae need not be fulfilled all simultaneously; fulfilling a particular one of them brings about the corresponding advantages in the variable-magnification optical system OS according to the present invention. Needless to say, the more conditional formulae are fulfilled, the more and greater advantages are brought about in the variable-magnification optical system OS according to the present invention.

Conditional formula (A) (conditional formula (2)) is as follows:

$$0.15<(\beta 2t/\beta 2w)/Z<0.80 \quad (A)$$

where $\beta 2t$ represents the horizontal magnification of the second lens group at the telephoto end;

$\beta 2w$ represents the horizontal magnification of the second lens group at the wide-angle end;

$Z=ft/fw$;

ft represents the focal length of the entire variable-magnification optical system at the telephoto end; and fw represents the focal length of the entire variable-magnification optical system at the wide-angle end.

Conditional formula (A), by dividing the zoom ratio (magnification variation ratio) of the second lens group GR2 by the zoom ratio Z of the entire optical system (the entire variable-magnification optical system OS), defines a preferred range of the responsibility for magnification variation to be borne by the second lens group GR2 in the zooming of the variable-magnification optical system OS. If the zoom ratio of the second lens group GR2 relative to the overall zoom ratio is greater than the upper limit of conditional formula (A), the second lens group GR2 is excessively responsible for magnification variation, leading to large distance variations on the upstream and downstream sides of the second lens group GR2. By contrast, if the zoom ratio of the second lens group GR2 relative to the overall zoom ratio is smaller than the lower limit of conditional formula (A), the third lens group GR3, for example, is excessively responsible for magnification variation, leading to large distance variations on the upstream and downstream sides of the third lens group GR3.

If only one of the second and third lens groups GR2 and GR3 is excessively responsible for magnification variation as described above, the variations in the distances on the upstream and downstream sides of that one lens group tend to be unduly large; thus, the movement stroke of that one lens group tends to be unduly long. With only one of the lens groups having an unduly long movement stroke in this way, an unduly wide space needs to be secured around that lens group, a cause that makes the variable-magnification optical system OS unacceptably large.

A lens group, even when excessively responsible for magnification variation, can be prevented from having an unduly long movement stroke by giving it a higher optical power. The increased optical power, however, produces larger aberrations within the lens group (for example, when the second lens group GR2 is given a higher optical power, it produces larger curvature of field and distortion at the wide-angle end). This inconvenience can be overcome, for example, by increasing the number of lens elements used or by making lens surfaces aspherical. Increasing the number of lens elements etc., however, makes the variable-magnification optical system OS still larger.

Out of the above considerations, in the variable-magnification optical system OS according to the present invention, the zoom ratio for which the second lens group GR2 needs to be responsible in the overall zoom ratio is appropriately set. Thus, within the range defined by conditional formula (A), according to the present invention, it is possible to realize a compact variable-magnification optical system OS while reducing (correcting) various aberrations.

The value of conditional formula (A) as actually observed in the variable-magnification optical system OS of the first embodiment is as follows:

$$(\beta 2t/\beta 2w)/Z=0.304$$

Within the range defined by conditional formula (A), it is further preferable that the range defined by conditional formula (A') below be fulfilled:

$$0.20<(\beta 2t/\beta 2w)/Z<0.60 \quad (A')$$

Conditional formula (B) (conditional formula (1)) is as follows:

$$1.1<\beta 3t/\beta 3w<5.0 \quad (B)$$

where
$\beta 3t$ represents the horizontal magnification of the third lens group at the telephoto end; and
$\beta 3w$ represents the horizontal magnification of the third lens group at the wide-angle end.

Conditional formula (B) defines a preferable range of the zoom ratio of the third lens group GR3. This is because, the more responsible the third lens group GR3 is for magnification variation, the less responsible therefor the second lens group GR2 can be made, which tends to be comparatively heavily responsible for magnification variation in the variable-magnification optical system OS having the positive-negative-positive-positive optical power arrangement.

If the ratio of the horizontal magnification $\beta 3t$ to the horizontal magnification $\beta 3w$ is greater than the upper limit of conditional formula (B), the third lens group GR3 is excessively responsible for magnification variation, leading to large distance variations on the upstream and downstream sides of the third lens group GR3. This makes the movement stroke of the third lens group GR3 unduly long. The third lens group GR3 can be prevented from having an unduly long movement stroke by giving it a higher optical power. The increased optical power, however, produces larger aberrations within the third lens group GR3.

By contrast, if the ratio of the horizontal magnification $\beta 3t$ to the horizontal magnification $\beta 3w$ is smaller than the lower limit of conditional formula (B), the third lens group GR3 is too little responsible for magnification variation, making the second lens group GR2 greatly responsible for magnification variation. This makes distance variations on the downstream and upstream sides of the second lens group GR2 unduly large. The second lens group GR2 can be prevented from having an unduly long movement stroke by giving it a higher optical power. The increased optical power, however, produces larger aberrations within the second lens group GR2.

If only one of the second and third lens groups GR2 and GR3 is excessively responsible for magnification variation as described above, the variations in the distances on the upstream and downstream sides of that one lens group are unduly large (that is, the movement stroke of the lens group excessively responsible for magnification variation is unduly long). With only one of the lens groups having an unduly long movement stroke in this way, an unduly wide space needs to be secured around that lens group, a cause that makes the variable-magnification optical system OS unacceptably large.

When the second or third lens group GR2 or GR3 is given a higher optical power to reduce its movement stroke, the increased optical power produces larger aberrations in the lens group. This inconvenience can be overcome, for example as described previously, by increasing the number of lens elements used etc., but doing so makes the variable-magnification optical system OS still larger.

Out of the above considerations, in the variable-magnification optical system OS according to the present invention, the second or third lens group GR2 or GR3 are assigned an appropriate share of responsibility for magnification variation. Thus, within the range defined by conditional formula (B), according to the present invention, it is possible to realize a compact variable-magnification optical system OS while reducing various aberrations.

The value of conditional formula (B) as actually observed in the variable-magnification optical system OS of the first embodiment is as follows:

$$\beta 3t/\beta 3w=3.614$$

Within the range defined by conditional formula (B), it is further preferable that the range defined by conditional formula (B') below be fulfilled:

$$1.5<\beta 3t/\beta 3w<4.0 \quad (B')$$

Conditional formula (C) (conditional formula (3)) is as follows:

$$0.2<f1/fm<1.0 \quad (3)$$

where
f1 represents the focal length of the first lens group;

$$fm = \sqrt{fw \times ft}$$

fw represents the focal length of the entire variable-magnification optical system at the wide-angle end; and ft represents the focal length of the entire variable-magnification optical system at the telephoto end Conditional formula (C) relates to the focal length, and hence the optical power, of the first lens group GR1. Conditional formula (C) defines, based on the optical power of the first lens group GR1, a preferable range to be fulfilled to achieve a proper balance between reduction of the total length of the variable-magnification optical system (the compactness thereof) and the reduction (correction) of aberrations.

If the ratio of the focal length f1 of the first lens group GR1 to the geometric mean $$fm \left( = \sqrt{fw \times ft} \right)$$

of the focal length fw of the variable-magnification optical system (the entire optical system) OS at the wide-angle end and the focal length ft of the variable-magnification optical system OS at the telephoto end is greater than the upper limit of conditional formula (C), the focal length f1 is comparatively long (that is, the optical power is comparatively weak).

In this case, since the optical power of the first lens group GR1 is weak, the movement stroke of the first lens group GR1 for zooming is long (and hence the variable-magnification optical system OS is unduly large). Generally, however, a weak optical power tends to produce less aberrations.

By contrast, if the ratio of the focal length f1 of the first lens group GR1 to the geometric mean fm (the focal length at the middle-focal-length position M) is smaller than the lower limit of conditional formula (C), the focal length f1 of the first lens group GR1 is comparatively short (that is, the optical power is comparatively strong).

In this case, since the optical power of the first lens group GR1 is strong, the movement stroke of the first lens group GR1 for zooming is comparatively short (and hence the variable-magnification optical system OS is comparatively compact). Moreover, the front element size and the like of the first lens group is comparatively small. However, when the first lens group GR1 is given such a strong positive optical power, it tends to produce larger aberrations (in particular, curvature of field and distortion). This inconvenience can be overcome, for example as described previously, by increasing the number of lens elements used or by making lens surfaces aspherical. Increasing the number of lens elements etc., however, makes the variable-magnification optical system OS still larger.

Out of the above considerations, in the variable-magnification optical system OS according to the present invention, the optical power of the first lens group is appropriately set. Thus, within the range defined by conditional formula (C), according to the present invention, it is possible to realize a compact variable-magnification optical system OS while reducing various aberrations.

The value of conditional formula (C) as actually observed in the variable-magnification optical system OS of the first embodiment is as follows:

f1/fm=0.347

Within the range defined by conditional formula (C), it is further preferable that the range defined by conditional formula (C') below be fulfilled:

0.3<f1/fm<0.6       (C')

Conditional formula (D) (conditional formula (4)) is as follows:

0.05<f3/f4<1.00       (D)

where f3 represents the focal length of the third lens group; and f4 represents the focal length of the fourth lens group.

Conditional formula (D) normalizes the focal length of the third lens group GR3 by dividing it by the focal length of the fourth lens group GR4. Conditional formula (D) defines, based on the optical power ratio between the third and fourth lens groups GR3 and GR4, a preferable range to be fulfilled to achieve a proper balance between the compactness of the variable-magnification optical system OS and high aberration correction performance.

When the upper limit of conditional formula (D) is crossed upward, the focal length of the fourth lens group GR4 is short, or the focal length of the third lens group GR3 is long. Thus, the optical power of the fourth lens group GR4 is comparatively strong, or the optical power of the third lens group GR3 is comparatively weak.

For example, if the optical power of the fourth lens group GR4 is strong, it produces accordingly large aberrations. This makes it difficult to satisfactorily correct curvature of field throughout from the wide-angle end W to the telephoto end T.

Moreover, when the fourth lens group GR4 moves for focusing, aberrations, in particular curvature of field and chromatic aberrations, tend to vary comparatively greatly. Such aberrations can be satisfactorily corrected by increasing the number of lens elements used or making lens surfaces aspherical, but doing so makes it difficult to make the variable-magnification optical system OS compact.

On the other hand, if the optical power of the fourth lens group GR4 is weak, the total length of the variable-magnification optical system OS is accordingly large. Moreover, since the weak optical power makes the movement stroke of the third lens group GR3 for focusing comparatively long. The weak optical power of the third lens group GR3 thus makes the total length of the variable-magnification optical system OS unduly large.

By contrast, of the lower limit of conditional formula (D) is crossed downward, the focal length of the third lens group GR3 is short, or the focal length of the fourth lens group GR4 is long. Thus, the optical power of the third lens group GR3 is comparatively strong, or the optical power of the fourth lens group GR4 is comparatively weak.

For example, if the optical power of the third lens group GR3 is comparatively strong, it produces accordingly large aberrations (in particular, spherical aberration). Aberrations can be satisfactorily corrected by increasing the number of lens elements used or making lens surfaces aspherical, but doing so makes it difficult to make the variable-magnification optical system OS compact.

On the other hand, if the optical power of the fourth lens group GR4 is comparatively weak, the weak optical power reduces the aberrations produced by the fourth lens group GR4. When the optical power of the fourth lens group GR4 is weak, however, the movement stroke of the fourth lens group GR4 for focusing is comparatively long. The weak optical of the fourth lens group GR4 thus makes the total length of the variable-magnification optical system OS unduly large.

Within the range defined by conditional formula (D), the inconveniences mentioned above are overcome, and thus, according to the present invention, it is possible to realize a compact variable-magnification optical system OS while reducing various aberrations (achieving high performance).

The value of conditional formula (D) as actually observed in the variable-magnification optical system OS of the first embodiment is as follows:

$$f3/f4=0.085$$

Within the range defined by conditional formula (D), it is further preferable that the range defined by conditional formula (D') below be fulfilled:

$$0.08<f3/f4<0.50 \qquad (D')$$

Conditional formula (E) (conditional formula (5)) is as follows:

$$ft/fw>12.00 \qquad (E)$$

where
- ft represents the focal length of the entire variable-magnification optical system at the telephoto end; and
- fw represents the focal length of the entire variable-magnification optical system at the wide-angle end.

Conditional formula (E) represents the zoom ratio of the variable-magnification optical system OS as a whole (the entire optical system). Thus, by fulfilling conditional formula (E), it is possible to achieve a notably higher zoom ratio than that of the conventional DSC 29 (offering zoom ratios of about 7× to 10×). That is, according to the present invention, it is possible to realize a variable-magnification optical system OS that offers a high zoom ratio. This increases the significance of zoom performance (magnification variation performance) in the variable-magnification optical system OS according to the present invention, thereby benefiting the user.

The value of conditional formula (E) as actually observed in the variable-magnification optical system OS of the first embodiment is as follows:

$$ft/fw=17.50$$

Within the range defined by conditional formula (E), it is further preferable that the range defined by conditional formula (E') below be fulfilled:

$$ft/fw \geq 15.00 \qquad (E')$$

In the variable-magnification optical system OS, when a lens group moves for zooming or the like, foreign matter (such as dust) may appear and settle on the image sensor SR of the lens group itself. To prevent this, in the variable-magnification optical system OS according to the present invention, the fifth lens group GR5, which is the lens group closest to the image sensor SR, is kept stationary. Thus, during zooming and focusing, the fifth lens group GR5 remains stationary, and thereby prevents entry of foreign matter.

The fifth lens group GR5 is given a positive optical power to enhance the telecentricity of the light beam that reaches the image sensor SR. Moreover, from the viewpoints of reducing cost and reducing the total length of the variable-magnification optical system OS, the fifth lens group GR5 includes, as an optical element that gives it the positive optical power, one single positive lens element (in the first embodiment, L14).

Moreover, in the variable-magnification optical system OS of the first embodiment, the fifth lens group GR5 includes the reflective mirror MR. That is, the reflective mirror MR is disposed to the image side of the fourth lens group GR4.

Usually, when the first to fourth lens groups GR1 to GR4 are arranged in a positive-negative-positive-positive optical power arrangement, for zooming from the wide-angle end W to the telephoto end T, the distance between the first and second lens groups GR1 and GR2 increases, the distance between the second and third groups GR2 and GR3 decreases, and the distance between the third and fourth lens groups GR3 and GR4 increases.

Thus, when the reflective mirror MR is disposed to the image side of the fourth lens group GR4, it does not interfere with the distance variations between the individual lens groups (between GR1 and GR2, between GR2 and GR3, and between GR3 and GR4). Thus, the variable-magnification optical system OS according to the present invention is so constructed that the normal distance variations between the individual lens groups (between GR1 and GR2, between GR2 and GR3, and between GR3 and GR4) are sustained during zooming.

Second Embodiment

Another embodiment of the present invention will be described below with reference to the drawings. Such members as serve the same purposes as their counterparts in the first embodiment are identified with common reference numerals and symbols, and no explanations thereof will be repeated.

Figure 8:
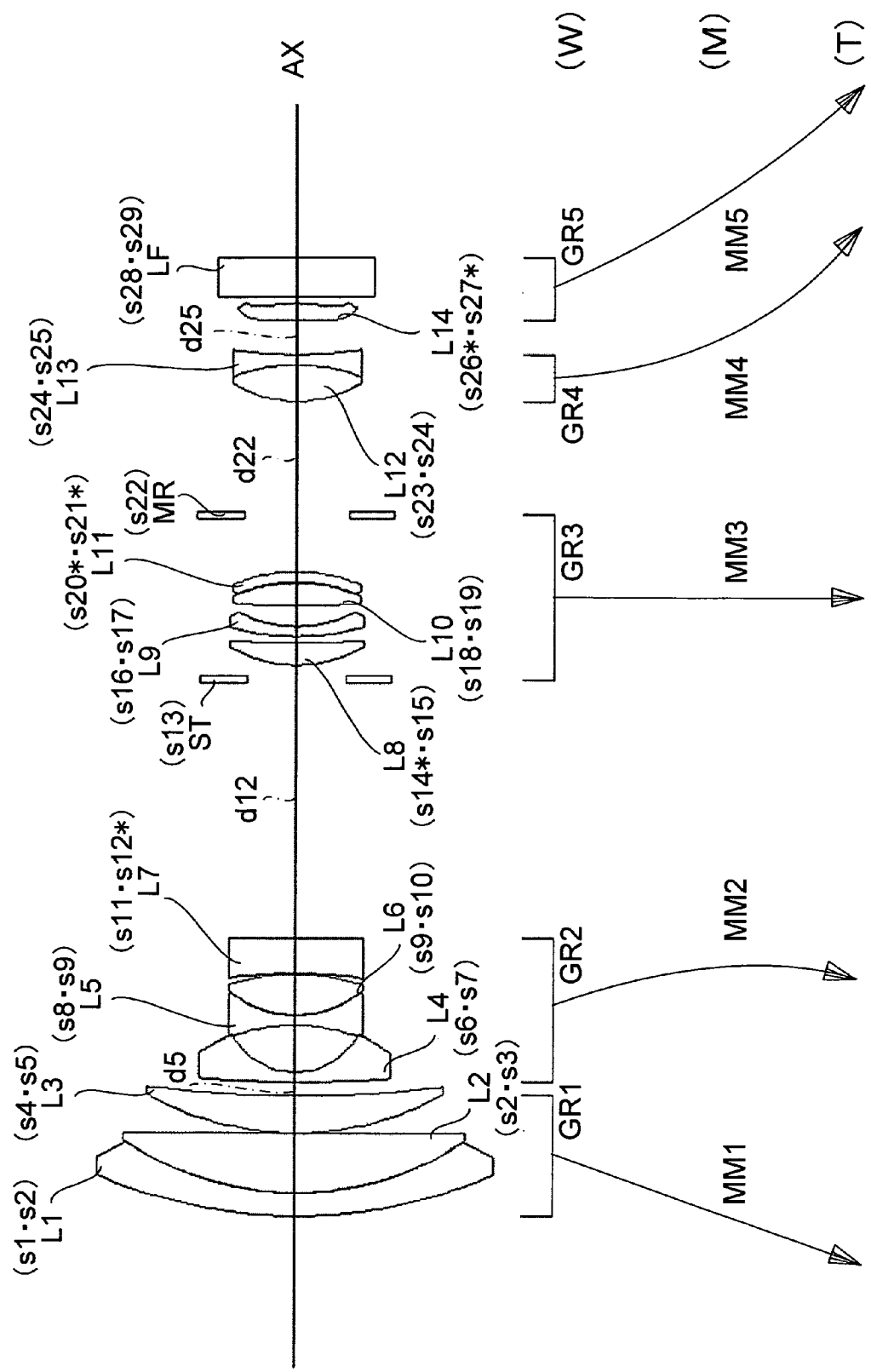
FIG. 8 is a lens construction diagram showing the variable-magnification optical system of Example 2, in its state developed along a straight line.
Figure 9:
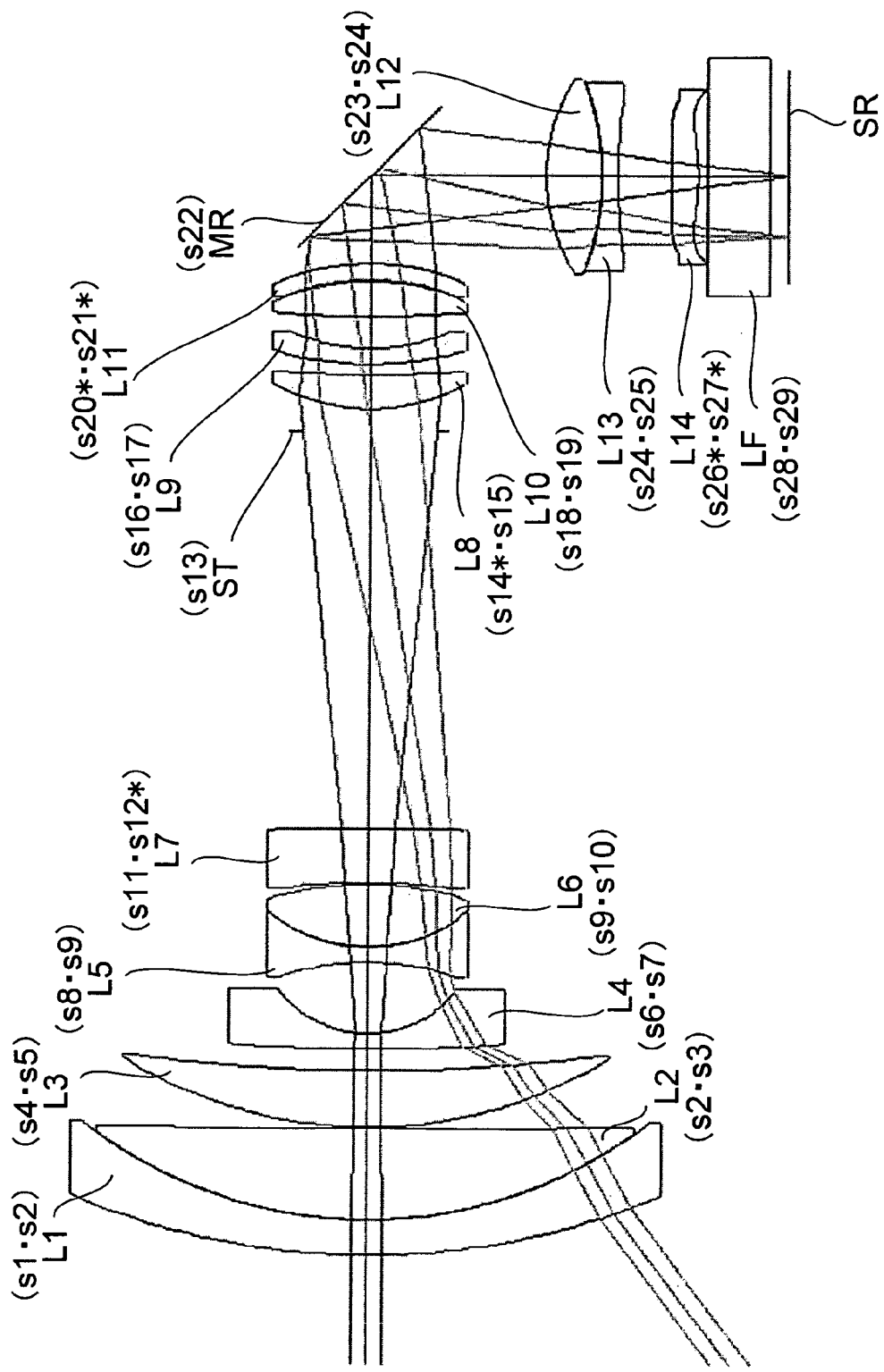
FIG. 9 is a lens construction diagram showing the variable-magnification optical system of Example 2 and an image sensor, in their state actually built in an image-taking apparatus (DSC) according to the present invention.
Figure 10A:
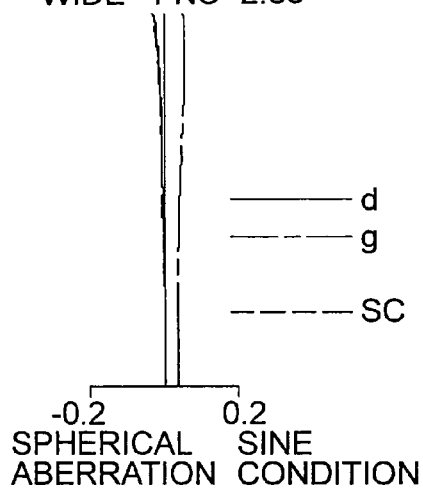
FIG. 10A is a diagram showing the spherical aberration observed in the variable-magnification optical system of Example 2 at the wide-angle end W of zooming.
Figure 10B:
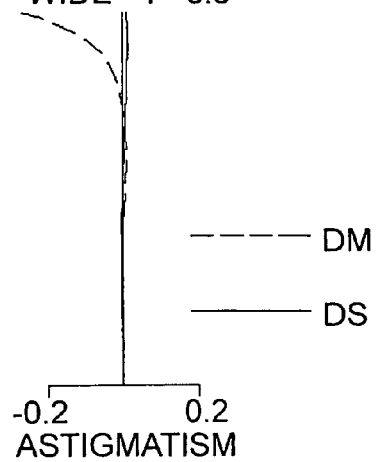
FIG. 10B is a diagram showing the astigmatism observed in the variable-magnification optical system of Example 2 at the wide-angle end W of zooming.
Figure 10C:
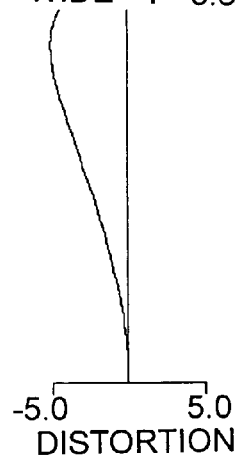
FIG. 10C is a diagram showing the distortion observed in the variable-magnification optical system of Example 2 at the wide-angle end W of zooming.
Figure 11A:
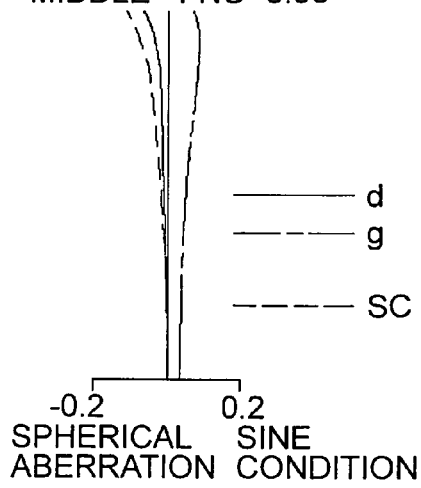
FIG. 11A is a diagram showing the spherical aberration observed in the variable-magnification optical system of Example 2 at the middle-focal-length position M of zooming.
Figure 11B:
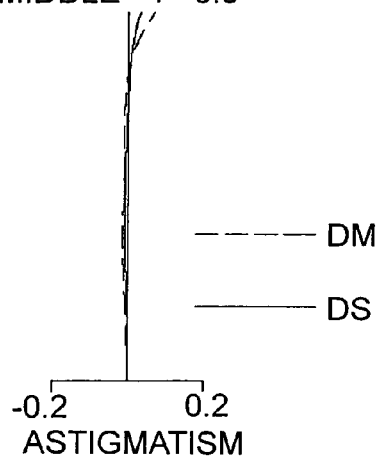
FIG. 11B is a diagram showing the astigmatism observed in the variable-magnification optical system of Example 2 at the middle-focal-length position M of zooming.
Figure 11C:
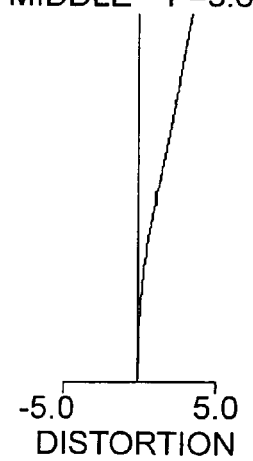
FIG. 11C is a diagram showing the distortion observed in the variable-magnification optical system of Example 2 at the middle-focal-length position M of zooming.
Figure 12A:
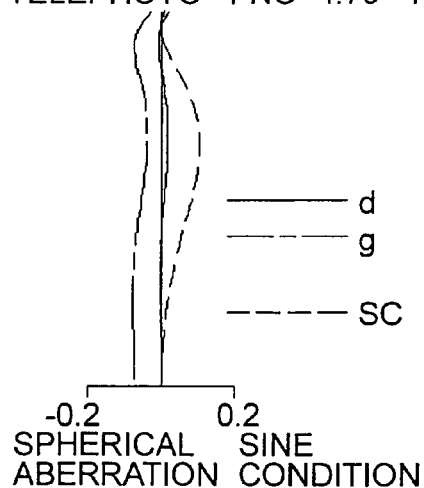
FIG. 12A is a diagram showing the spherical aberration observed in the variable-magnification optical system of Example 2 at the telephoto end T of zooming.
Figure 12B:
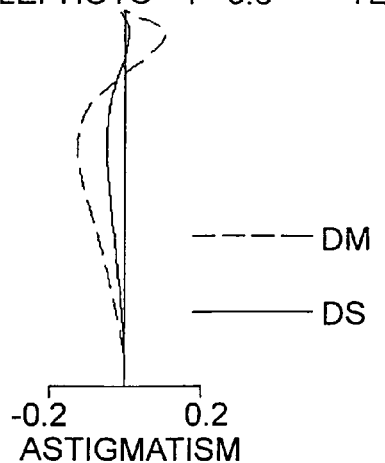
FIG. 12B is a diagram showing the astigmatism observed in the variable-magnification optical system of Example 2 at the telephoto end T of zooming.
Figure 12C:
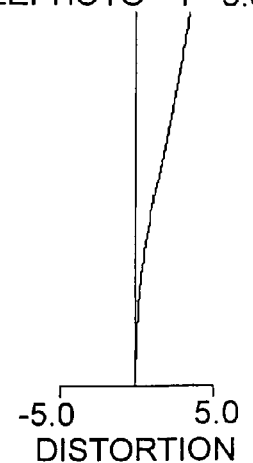
FIG. 12C is a diagram showing the distortion observed in the variable-magnification optical system of Example 2 at the telephoto end T of zooming.

In the variable-magnification optical system OS (Example 1) of the first embodiment, the reflective mirror MR is disposed to the image side of the fourth lens group GR4. This, however, is not meant to limit the position of the reflective mirror MR in any way. To substantiate that, another (Example 2) example of the variable-magnification optical system OS will now be described with reference to FIGS. 8 and 9. In FIGS. 8 and 9, the same conventions as those used in FIGS. 1 and 2 are used.

1. Variable-Magnification Optical System of Example 2

The variable-magnification optical system OS of Example 2 shown in FIGS. 8 and 9 includes, from the shooting target (object) side, a first lens group GR1, a second lens group GR2, a third lens group GR3, a fourth lens group GR4, and a fifth lens group GR5. These lens groups GR1 to GR5 are arranged, as in the variable-magnification optical system OS of Example 1, in a positive-negative-positive-positive-positive optical power arrangement.

1-1. Construction of the Variable-Magnification Optical System (Example 2)

The variable-magnification optical system OS includes, from the shooting target (object) side, a first lens group GR1, a second lens group GR2, a third lens group GR3, a fourth lens group GR4, and a fifth lens group GR5.

1-1-1. First Lens Group

The first lens group GR1 includes, from the object side, a first lens element L1, a second lens element L2, and a third lens element L3.

Used as the lens elements are:
The first lens element L1: a negative meniscus lens element convex to the object side;
The second lens element L2: a positive meniscus lens element convex to the object side; and
The third lens element L3: a positive meniscus lens element convex to the object side.

Here, the first and second lens elements L1 and L2 are cemented together at the surface s2, and are thereby formed into a cemented lens element.

1-1-2. Second Lens Group

The second lens group GR2 includes, from the object side, a fourth lens element L4, a fifth lens element L5, a sixth lens element L6, and a seventh lens element L7.
Used as the lens elements are:
The fourth lens element L4: a negative meniscus lens element convex to the object side;
The fifth lens element L5: a biconcave negative lens element;
The sixth lens element L6: a biconvex positive lens element; and
The seventh lens element L7: a negative meniscus lens element concave to the object side (having an aspherical surface as the surface s12)

Here, the fifth and sixth lens elements L5 and L6 are cemented together at the surface s9, and are thereby formed into a cemented lens element.

1-1-3. Third Lens Group

The third lens group GR3 includes, from the object side, an optical aperture stop ST, an eighth lens element L8, a ninth lens element L9, a tenth lens element L10, an eleventh lens element L11, and a reflective mirror MR.
Used as the optical aperture stop ST, the lens elements, and the reflective mirror MR are:
The optical aperture stop ST: an aperture stop that intercepts part of the light beam that has passed through the first and second lens groups GR1 and GR2; also identified as s13; built integrally with the third lens group GR3;
The eighth lens element L8: a positive meniscus lens element convex to the object side (having an aspherical surface as the surface s14);
The ninth lens element L9: a negative meniscus lens element convex to the object side;
The tenth lens element L10: a biconvex positive lens element;
The eleventh lens element L11: a negative meniscus lens element concave to the object side (having aspherical surfaces as the surfaces s20 and s21); and
The reflective mirror MR: an optical axis changing element that bends at about 90° the optical axis of the light beam that has passed through the first to eleventh lens elements L1 to L11; built integrally with the third lens group GR3.

1-1-4. Fourth Lens Group

The fourth lens group GR4 includes, from the object side, a twelfth lens element L12 and a thirteenth lens element L13.
Used as the lens elements are:
The twelfth lens element L12: a biconvex positive lens element; and
The thirteenth lens element L13: a biconcave negative lens element.

Here, the twelfth and thirteenth lens elements L12 and L13 are cemented together at the surface s24, and are thereby formed into a cemented lens element.

2-1-4. Fifth Lens Group

The fifth lens group GR5 includes, from the object side, a fourteenth lens element L14 and a low-pass filter LF.
Used as the fourteenth lens element L14 and the low-pass filter LF are:
The fourteenth lens element L14: a negative meniscus lens element concave to the object side (having aspherical surfaces as the surfaces s26 and s27); and
The low-pass filter LF: an optical filter having two surfaces (s28 and s29); having a predetermined cut-off frequency characteristic determined by the pixel pitch of the image sensor SR.

1-2. Construction Data of the Variable-Magnification Optical System (Example 2)

Next, the construction data of the variable-magnification optical system OS of Example 2 will be explained with reference to Tables 3 and 4. In Tables 3 and 4, the same conventions as those used in Tables 1 and 2 are used.

1-3. Movement of the Lens Groups in the Variable-Magnification Optical System (Example 2)

In the variable-magnification optical system OS of Example 2, as shown in FIG. 8, for zooming, the third lens group GR3 is kept stationary, and the other lens groups Gr1, Gr2, Gr4, and GR5 are moved. Thus, during zooming, the distances between the lens groups (group-to-group distances) vary.

Specifically, for zooming from the wide-angle end to the telephoto end, in the variable-magnification optical system OS, the group-to-group distance between the first and second lens groups GR1 and GR2 increases, the group-to-group distance between the second and third lens groups GR2 and GR3 decreases, the group-to-group distance between the third and fourth lens groups GR3 and GR4 increases, and the group-to-group distance between the fourth and fifth lens groups GR4 and GR5 increases.

In FIG. 8, of all the axial distances di, only those which vary with zooming are indicated, namely d5, d12, d22, and d25 FIGS. 10A to 10C, 11A to 11C, and 12A to 12C show the aberrations observed in the variable-magnification optical system OS of Example 2 at different zoom positions (focal-length positions). In FIGS. 10A to 10C, 11A to 11C, and 12A to 12C, the same conventions as those used in FIGS. 3A to 3C, 4A to 4C, and 5A to 5C are used.

2. Examples of Various Features of the Present Invention

As described above, according to another aspect (Example 2) of the present invention, as in Example 1, a variable-magnification optical system OS is provided with: a plurality of lens groups that image the light beam from the object side on an image sensor SR; an optical aperture stop ST that intercepts part of the light beam heading for the image sensor SR; and a reflective mirror MR that changes the optical axis of the light beam of which part has been intercepted by the optical aperture stop ST. The plurality of lens groups include a first to a fourth lens group GR1 to GR4 arranged in a positive-negative-positive-positive optical power arrangement. Of these lens groups, at least two (in Example 2, GR1, GR2, GR4 and GR5) are moved for zooming from the wide-angle end to the telephoto end.

That is, the variable-magnification optical system OS of Example 2 also has the first to fourth lens groups GR1 to GR4 arranged in a positive-negative-positive-positive optical power arrangement. Thus, an optical aperture stop ST is typically disposed near the third lens group GR3. Accordingly, as in Example 1, a reflective mirror MR is typically disposed to the image side of the optical aperture stop ST. In the variable-magnification optical system OS of Example 2, the optical aperture stop ST is disposed at the most object-side position in the third lens group GR3, and the reflective mirror MR is disposed at the most image-side position in the third lens group GR3.

When the reflective mirror MR is disposed at the most image-side position in the third lens group GR3 in this way, the fourth and fifth lens groups GR4 and GF5, which are disposed to the image side of the reflective mirror MR, can be built inside the body of a DSC 29 or the like. Then, as with Example 1, the DSC 29 according to the invention, as compared with a DSC incorporating a straight optical system, has a smaller depth-direction dimension U (see FIG. 6A).

The variable-magnification optical system OS of Example 2 also reflects the light beam on the downstream side of the optical aperture stop ST, and this permits the reflective mirror MR to be made comparatively compact (specifically, because the reflective mirror MR is disposed between the third and fourth lens groups GR3 and GR4). Thus, also with Example 2, simply through the inclusion of the comparatively compact reflective mirror MR, the variable-magnification optical system OS permits part of its lens groups to be properly built in the limited space inside the body of the DSC 29.

Moreover, in the variable-magnification optical system OS of Example 2, during zooming, the third lens group GR3 is kept stationary. Thus, the third lens group GR3 can easily be built inside the body of the DSC 29. This makes it possible, for example, to reduce the number of lens groups built in the lens barrel LB, and thereby permits flexible designing of the DSC 29.

In addition, as noted below, the variable-magnification optical system OS of Example 2 fulfills conditional formulae (A) to (E). Thus, the variable-magnification optical system OS of Example 2 also offers the advantages corresponding to those conditional formulae. Specifically, the values of conditional formulae (A) to (E) as actually observed in Example 2 are respectively as follows:

$(\beta 2t/\beta 2w)/Z = 0.318$ $\beta 3t/\beta 3w = 3.159$ $f1/fm = 0.525$ $f3/f4 = 0.189$ $ft/fw = 17.49$ Other Embodiments The present invention may be carried out in any manner other than specifically described by way of embodiments above, and many modifications and variations are possible within the spirit of the present invention.

For example, the DSC 29 according to the present invention has been described as being so constructed that, as shown in FIG. 6A, the optical axis AX after being changed by the reflective mirror MR and the direction of the height H of the DSC 29 point in the same direction (this arrangement is called the "vertical arrangement"). This, however, is not meant to limit in any way how the present invention is practically carried out. For example, it is instead possible to adopt a construction where, for example, the optical axis AX after being changed by the reflective mirror MR and the horizontal direction of the DSC 29 (the direction perpendicular to the sheet of FIG. 6A) point in the same direction (this arrangement is called the "horizontal arrangement").

The variable-magnification optical systems OS of Examples 1 and 2 both use a reflective mirror MR to change the optical axis. This, however, is not meant to limit in any way the construction of a variable-magnification optical system OS according to the present invention. For example, it is possible to use, instead of a reflective mirror MR, an optical prism (for example, a rectangular prism). Using a reflective mirror MR helps reduce the cost of the variable-magnification optical system OS, while using an optical prism helps facilitate the optical design of the variable-magnification optical system OS.

An image-taking apparatus according to the present invention is an optical apparatus that optically captures an image of a subject and that then outputs it in the form of an electrical signal. Such an image-taking apparatus is used as a principal component of a camera that is used to shoot a still or moving picture of a subject. Examples of such cameras include: digital still cameras; video cameras; surveillance cameras; vehicle-mounted cameras; cameras for videophones; cameras for intercoms. Also included in such cameras are: cameras incorporated in or externally fitted to personal computers, portable information appliances (compact, portable information appliance terminals, such as mobile computers, cellular phones, and personal digital assistants (PDAs)), peripheral devices therefor (such as mouses, scanners, printers, and memories), other digital appliances, and the like.

As these examples show, not only is it possible to build cameras by using image-taking apparatuses, it is also possible to build image-taking apparatuses into various appliances to add camera capabilities thereto. For example, it is possible to build a digital appliance equipped for image capturing, such as a cellular phone fitted with a camera.

In the past, the term "digital camera" was used to refer exclusively to cameras that electronically record optical still pictures; nowadays, in this era in which digital still cameras and home-use movie cameras are available that can handle both still and moving pictures, the term has come to be used without the traditional connotation. Accordingly, it should be understood that, in the present specification, the term "digital camera" is used to refer to any kind of camera that incorporate as a main component an image-taking apparatus comprising an image-taking lens system for forming an optical image, an image sensor for converting the optical image into an electrical image signal, and other components. Specifically, examples of such cameras encompass, to name only a few: digital still cameras; digital movie cameras; and web cameras (that is, cameras, whether of an open type or of a private type, that are connected to an appliance connected to a network to permit exchange of images, including both those connected directly to the network and those connected to it via an appliance, such as a personal computer, having information processing capabilities).

Moreover, variable-magnification optical systems OS according to the present invention are used in various image-taking apparatuses and digital input devices (for example, digital appliances equipped with image-taking apparatuses). Thus, image-taking apparatuses and the like employing variable-magnification optical systems OS according to the present invention are compact. In an image-taking apparatus or the like, the variable-magnification optical system OS occupies a comparatively small portion of the volume of the interior of the chassis (housing)

thereof. This makes it possible to arrange various components (electronic components and the like) inside an ample housing of an image-taking apparatus or the like (the volume of the housing can efficiently be used). Thus, it is possible to realize a high-performance image-taking apparatus incorporating various components.

Variable-magnification optical systems and image-taking apparatuses according to the present invention, of which a few examples have been described above, can alternatively be expressed in the following manners.

It is preferable that a variable-magnification optical system according to the present invention fulfill conditional formula (A) below:

$$0.15 < (\beta 2t/\beta 2w)/Z < 0.80 \quad (A)$$

where
- $\beta 2t$ represents the horizontal magnification of the second lens group at the telephoto end;
- $\beta 2w$ represents the horizontal magnification of the second lens group at the wide-angle end;
- $Z = ft/fw$;
- ft represents the focal length of the entire variable-magnification optical system at the telephoto end; and
- fw represents the focal length of the entire variable-magnification optical system at the wide-angle end.

Conditional formula (A) defines a range of the proportion of the zoom ratio for which the second lens group GR2 should preferably be responsible. Within this range, it is possible to properly distribute the zoom ratio between the second and third lens groups. Thus, within the range defined by conditional formula (A), no lens group is excessively responsibly for magnification variation. Thus, it is possible to realize a compact variable-magnification optical system OS while reducing (correcting) various aberrations.

It is preferable that a variable-magnification optical system according to the present invention fulfill conditional formula (C) below:

$$0.2 < f1/fm < 1.0 \quad (3)$$

where
- f1 represents the focal length of the first lens group;

$$fm = \sqrt{fw \times ft}$$

- fw represents the focal length of the entire variable-magnification optical system at the wide-angle end; and
- ft represents the focal length of the entire variable-magnification optical system at the telephoto end Conditional formula (C) relates to the focal length (optical power) of the first lens group, and defines, based on the optical power of the first lens group, a range that should preferably be fulfilled to achieve a proper balance between the reduction of the total length of the variable-magnification optical system and the reduction (correction) of various aberrations. Within the range defined by conditional formula (C), according to the present invention, it is possible to realize a compact variable-magnification optical system while reducing various aberrations.

It is preferable that a variable-magnification optical system according to the present invention fulfill conditional formula (D) below:

$$0.05 < f3/f4 < 1.00 \quad (D)$$

where
- f3 represents the focal length of the third lens group; and
- f4 represents the focal length of the fourth lens group.

Conditional formula (D) defines, based on the optical power ratio between the third and fourth lens groups, a range that should preferably be fulfilled to achieve a proper balance between the compactness of the variable-magnification optical system and high-performance aberration correction. Thus, also within the range defined by conditional formula (D), it is possible to realize a compact variable-magnification optical system while reducing various aberrations.

It is preferable that a variable-magnification optical system according to the present invention fulfill conditional formula (E) below:

$$ft/fw \geq 12.00 \quad (E)$$

where
- ft represents the focal length of the entire variable-magnification optical system at the telephoto end; and
- fw represents the focal length of the entire variable-magnification optical system at the wide-angle end.

Conditional formula (E) represents the magnification variation ratio of the variable-magnification optical system. When conditional formula (E) is fulfilled, according to the present invention, it is possible to realize a variable-magnification optical system that offers a high magnification variation ratio. This increases the significance of zoom performance in the variable-magnification optical system according to the present invention, thereby benefiting the user.

Moreover, it is preferable that the plurality of lens groups provided in the variable-magnification optical system include, to the image side of the fourth lens group, a fifth lens group that is kept stationary during magnification variation. With this construction, it is possible to eliminate the possibility of foreign matter (dust) ascribable to the movement of the fifth lens unit from settling on the image sensor disposed nearby. Thus, it is less likely that dust on the image-sensing surface is sensed (and appears on the sensed image).

Moreover, in the variable-magnification optical system according to the present invention, for higher telecentric to the image sensor, it is preferable to provide a fifth lens group that has a positive optical power. From the viewpoint of making the variable-magnification optical system compact, it is preferable that the optical element that is provided in the fifth lens group to give it the positive optical power be a single positive lens element.

In the variable-magnification optical system according to the present invention, the optical axis changing element may be disposed to the image side of the fourth lens group, or between the third and fourth lens groups.

Needless to say, an image-taking apparatus incorporating a variable-magnification optical system as described above offers the advantages that the variable-magnification optical system itself offers.

The embodiments, examples, and the like specifically described above are merely intended to make the technical idea of the present invention clear. The present invention, therefore, should not be interpreted narrowly within the extent of what is specifically described above, but should be interpreted to allow many modifications and variations within the scope of the appended claims.

TABLE 1

| Example 1 | Focal Length Position | | (W)~(M)~(T) | | |
|---|---|---|---|---|---|
| | f[mm] | | 4.78~20.00~83.67 | | |
| | FNO | | 2.88~4.04~4.60 | | |

| i | ri[mm] | i | di[mm] | i | Ni | vi | Element | |
|---|---|---|---|---|---|---|---|---|
| 1 | 68.128 | 1 | 2.010 | 1 | 1.84666 | 23.78 | L1 | GR1 |
| 2 | 41.256 | 2 | 4.624 | 2 | 1.49700 | 81.61 | L2 | |
| 3 | -402.583 | 3 | 0.100 | | | | | |
| 4 | 39.154 | 4 | 3.161 | 3 | 1.72916 | 54.67 | L3 | |
| 5 | 112.406 | 5 | 1.000~19.970~36.040 | | | | | |
| 6 | 77.361 | 6 | 0.900 | 4 | 1.88300 | 40.79 | L4 | GR2 |
| 7 | 9.393 | 7 | 4.510 | | | | | |
| 8 | -62.254 | 8 | 0.910 | 5 | 1.88300 | 40.79 | L5 | |
| 9 | 11.782 | 9 | 6.046 | 6 | 1.84666 | 23.78 | L6 | |
| 10 | -19.097 | 10 | 3.493 | | | | | |
| 11 | -12.104 | 11 | 0.900 | 7 | 1.77250 | 49.36 | L7 | |
| 12* | 146.222 | 12 | 22.967~7.653~1.701 | | | | ST | |
| 13 | ∞ | 13 | 1.300 | | | | | |
| 14* | 10.430 | 14 | 5.201 | 8 | 1.58913 | 61.25 | L8 | GR3 |
| 15 | -49.489 | 15 | 0.100 | | | | | |
| 16 | 33.191 | 16 | 0.900 | 9 | 1.84666 | 23.78 | L9 | |
| 17 | 11.506 | 17 | 1.356 | | | | | |
| 18 | 23.732 | 18 | 1.889 | 10 | 1.49700 | 81.61 | L10 | |
| 19 | -18.580 | 19 | 0.100 | | | | | |
| 20* | -42.310 | 20 | 1.034 | 11 | 1.53048 | 55.72 | L11 | |
| 21* | -33.970 | 21 | 2.540~8.184~22.620 | | | | | |
| 22 | -10.466 | 22 | 0.910 | 12 | 1.49700 | 81.61 | L12 | GR4 |
| 23 | -17.096 | 23 | 1.292 | 13 | 1.80420 | 46.50 | L13 | |
| 24 | -12.104 | 24 | 6.000~13.492~6.592 | | | | MR | |
| 25 | ∞ | 25 | 5.000 | | | | | GR5 |
| 26* | -1043.907 | 26 | 1.757 | 14 | 1.53048 | 55.72 | L14 | |
| 27* | -20.469 | 27 | 0.500 | | | | | |
| 28 | ∞ | 28 | 3.500 | 15 | 1.51633 | 64.14 | LF | |
| 29 | ∞ | | | | | | | |

TABLE 2

Example 1

ε  1.0000

Aspherical Surface Data
of Surface 12 (i = 12)

A4   -0.91663343 E-04
A6   -0.66526238 E-06
A8    0.34212125 E-07
A10  -0.15524820 E-08

Aspherical Surface Data
of Surface 14 (i = 14)

A4   -0.12010345 E-03
A6   -0.16553806 E-05
A8    0.93010493 E-07
A10  -0.34273164 E-08
A12   0.42099538 E-010

TABLE 2-continued

Example 1

ε  1.0000

Aspherical Surface Data
of Surface 20 (i = 20)

A4   -0.16318948 E-03
A6    0.69910303 E-05
A8   -0.74691802 E-06
A10   0.19648128 E-07
A12  -0.10541709 E-09

Aspherical Surface Data
of Surface 21 (i = 21)

A4   -0.82361509 E-04
A6    0.65356103 E-05
A8   -0.69009511 E-06
A10   0.16103161 E-07
A12   0.13433638 E-015

TABLE 2-continued

Example 1

ε    1.0000

Aspherical Surface Data
of Surface 26 (i = 26)

A4    0.27609576 E-03
A6    0.31488940 E-04
A8    −0.55238893 E-05
A10   0.15369530 E-06

Aspherical Surface Data
of Surface 27 (i = 27)

A4    0.73903613 E-03
A6    0.32391718 E-04
A8    −0.69254038 E-05
A10   0.19316650 E-06

TABLE 4

Example 2

ε    1.0000

Aspherical Surface Data
of Surface 12 (i = 12)

A4    −0.75127708 E-04
A6    −0.61459712 E-07
A8    −0.22898066 E-07
A10   0.74753972 E-09

Aspherical Surface Data
of Surface 14 (i = 14)

A4    −0.11038306 E-03
A6    −0.19105081 E-05
A8    0.10029777 E-06
A10   −0.28547877 E-08
A12   0.32098139 E-010

TABLE 3

| Example 2 | | Focal Length Position | | | (W)~(M)~(T) | | |
|---|---|---|---|---|---|---|---|
| | | f[mm] | | | 4.78~20.00~83.58 | | |
| | | FNO | | | 2.88~3.97~4.79 | | |
| i | ri[mm] | i | di[mm] | i | Ni | νi | Element |
| 1 | 42.747 | 1 | 2.010 | 1 | 1.84666 | 23.78 | L1 / GR1 |
| 2 | 25.929 | 2 | 5.128 | 2 | 1.49700 | 81.61 | L2 / GR1 |
| 3 | 969.772 | 3 | 0.100 | | | | |
| 4 | 26.010 | 4 | 3.200 | 3 | 1.72916 | 54.67 | L3 |
| 5 | 98.534 | 5 | 1.210~14.606~22.455 | | | | |
| 6 | 103.447 | 6 | 0.900 | 4 | 1.88300 | 40.79 | L4 / GR2 |
| 7 | 6.260 | 7 | 4.029 | | | | |
| 8 | -16.021 | 8 | 0.910 | 5 | 1.88300 | 40.79 | L5 / GR2 |
| 9 | 8.792 | 9 | 3.547 | 6 | 1.84666 | 23.78 | L6 |
| 10 | -19.782 | 10 | 0.100 | | | | |
| 11 | -38.031 | 11 | 3.108 | 7 | 1.77250 | 49.36 | L7 |
| 12 | -1483.349 * | 12 | 22.718~9.029~1.018 | | | | ST |
| 13 | ∞ | 13 | 1.300 | | | | |
| 14 | 10.326 * | 14 | 1.937 | 8 | 1.58913 | 61.25 | L8 |
| 15 | 76.176 | 15 | 0.600 | | | | |
| 16 | 19.085 | 16 | 0.900 | 9 | 1.84666 | 23.78 | L9 / GR3 |
| 17 | 10.680 | 17 | 1.797 | | | | |
| 18 | 60.219 | 18 | 1.983 | 10 | 1.49700 | 81.61 | L10 |
| 19 | -13.775 | 19 | 0.100 | | | | |
| 20 | -13.556 * | 20 | 0.900 | 11 | 1.53048 | 55.72 | L11 |
| 21 | -14.958 * | 21 | 5.000 | | | | MR |
| 22 | ∞ | 22 | 10.000~18.487~38.454 | | | | |
| 23 | 10.147 | 23 | 3.143 | 12 | 1.49700 | 81.61 | L12 / GR4 |
| 24 | -15.271 | 24 | 0.900 | 13 | 1.80420 | 46.50 | L13 |
| 25 | 34.028 | 25 | 3.000~9.077~10.000 | | | | |
| 26 | -52.564 * | 26 | 1.483 | 14 | 1.53048 | 55.72 | L14 / GR5 |
| 27 | -11.550 * | 27 | 0.500 | | | | LF |
| 28 | ∞ | 28 | 3.500 | 15 | 1.51633 | 64.14 | |
| 29 | ∞ | | | | | | |

TABLE 4-continued

Example 2

| | |
|---|---|
| ε | 1.0000 |
| Aspherical Surface Data of Surface 20 (i = 20) | |
| A4 | −0.13370933 E-03 |
| A6 | 0.79510067 E-05 |
| A8 | −0.80787469 E-06 |
| A10 | 0.18789939 E-07 |
| A12 | −0.85920571 E-010 |
| Aspherical Surface Data of Surface 21 (i = 21) | |
| A4 | −0.11323003 E-03 |
| A6 | 0.55902655 E-05 |
| A8 | −0.63997776 E-06 |
| A10 | 0.14782512 E-07 |
| A12 | −0.63962613 E-010 |
| Aspherical Surface Data of Surface 26 (i = 26) | |
| A4 | 0.11150447 E-02 |
| A6 | 0.51520220 E-04 |
| A8 | −0.33839962 E-05 |
| A10 | 0.10013441 E-06 |
| Aspherical Surface Data of Surface 27 (i = 27) | |
| A4 | 0.17736464 E-02 |
| A6 | 0.79872650 E-04 |
| A8 | −0.62093284 E-05 |
| A10 | 0.19312306 E-06 |

What is claimed is:

1. A variable-magnification optical system comprising:
a plurality of lens groups that image a light beam from an object side on an image sensor;
an optical aperture stop that intercepts part of the light beam heading for the image sensor; and
an optical axis changing element that changes an optical axis of the light beam of which part has been intercepted by the optical aperture stop,
wherein the plurality of lens groups include, from the object side to an image side, at least:
a first lens group having a positive optical power;
a second lens group having a negative optical power;
a third lens group having a positive optical power; and
a fourth lens group having a positive optical power,
at least two of the lens groups being moved for magnification variation from a wide-angle end to a telephoto end, and
wherein conditional formula (1) below is fulfilled:

$$1.1 < \beta 3t/\beta 3w < 5.0 \tag{1}$$

where
β3t represents a horizontal magnification of the third lens group at the telephoto end; and
β3w represents a horizontal magnification of the third lens group at the wide-angle end.

2. The variable-magnification optical system of claim 1, wherein conditional formula (2) below is fulfilled:

$$0.15 < (\beta 2t/\beta 2w)/Z < 0.80 \tag{2}$$

where
β2t represents a horizontal magnification of the second lens group at the telephoto end;
β2w represents a horizontal magnification of the second lens group at the wide-angle end;
Z=ft/fw;
ft represents a focal length of the entire variable-magnification optical system at the telephoto end; and
fw represents a focal length of the entire variable-magnification optical system at the wide-angle end.

3. The variable-magnification optical system of claim 1, wherein conditional formula (3) below is fulfilled:

$$0.2 < fl/fm < 1.0 \tag{3}$$

where
fl represents a focal length of the first lens group;

$$fm = \sqrt{fw \times ft}$$

fw represents a focal length of the entire variable-magnification optical system at the wide-angle end; and
ft represents a focal length of the entire variable-magnification optical system at the telephoto end.

4. The variable-magnification optical system of claim 2, wherein conditional formula (3) below is fulfilled:

$$0.2 < fl/fm < 1.0 \tag{3}$$

where
fl represents a focal length of the first lens group;

$$fm = \sqrt{fw \times ft} \, ;$$

fw represents a focal length of the entire variable-magnification optical system at the wide-angle end; and
ft represents a focal length of the entire variable-magnification optical system at the telephoto end.

5. The variable-magnification optical system of claim 1, wherein conditional formula (4) below is fulfilled:

$$0.05 < f3/f4 < 1.00 \tag{4}$$

where
f3 represents a focal length of the third lens group; and
f4 represents a focal length of the fourth lens group.

6. The variable-magnification optical system of claim 2, wherein conditional formula (4) below is fulfilled:

$$0.05 < f3/f4 < 1.00 \tag{4}$$

where
f3 represents a focal length of the third lens group; and
f4 represents a focal length of the fourth lens group.

7. The variable-magnification optical system of claim 3, wherein conditional formula (4) below is fulfilled:

$$0.05 < f3/f4 < 1.00 \tag{4}$$

where
f3 represents a focal length of the third lens group; and
f4 represents a focal length of the fourth lens group.

8. The variable-magnification optical system of claim 4, wherein conditional formula (4) below is fulfilled:

$$0.05 < f3/f4 < 1.00 \tag{4}$$

where
f3 represents a focal length of the third lens group; and
f4 represents a focal length of the fourth lens group.

9. The variable-magnification optical system of claim 1, wherein conditional formula (5) below is fulfilled:

$$ft/fw \geq 12.00 \tag{5}$$

where
ft represents a focal length of the entire variable-magnification optical system at the telephoto end; and
fw represents a focal length of the entire variable-magnification optical system at the wide-angle end.

10. The variable-magnification optical system of claim 1, wherein the plurality of lens groups further include a fifth lens group disposed further to the image side of the fourth lens group, the fifth lens group remaining stationary during magnification variation.

11. The variable-magnification optical system of claim 10, wherein the fifth lens group has a positive optical power.

12. The variable-magnification optical system of claim 11, wherein an optical element that gives the fifth lens group the positive optical power thereof is a single positive lens element.

13. The variable-magnification optical system of claim 1, wherein the optical axis changing element is disposed to the image side of the fourth lens group.

14. The variable-magnification optical system of claim 1, wherein the optical axis changing element is disposed between the third and fourth lens groups.

15. An image-taking apparatus incorporating a variable-magnification optical system, the variable-magnification optical system comprising:
a plurality of lens groups that image a light beam from an object side on an image sensor;
an optical aperture stop that intercepts part of the light beam heading for the image sensor; and
an optical axis changing element that changes an optical axis of the light beam of which part has been intercepted by the optical aperture stop,
wherein the plurality of lens groups include, from the object side to an image side, at least:
a first lens group having a positive optical power;
a second lens group having a negative optical power;
a third lens group having a positive optical power; and
a fourth lens group having a positive optical power,
at least two of the lens groups being moved for magnification variation from a wide-angle end to a telephoto end, and
wherein conditional formula (1) below is fulfilled:

$$1.1 < \beta 3t/\beta 3w < 5.0 \quad (1)$$

where
$\beta 3t$ represents a horizontal magnification of the third lens group at the telephoto end; and
$\beta 3w$ represents a horizontal magnification of the third lens group at the wide-angle end.

16. The image-taking apparatus of claim 15, wherein conditional formula (2) below is fulfilled:

$$0.15 < (\beta 2t/\beta 2w)/Z < 0.80 \quad (2)$$

where
$\beta 2t$ represents a horizontal magnification of the second lens group at the telephoto end;
$\beta 2w$ represents a horizontal magnification of the second lens group at the wide-angle end;
$Z = ft/fw$;
ft represents a focal length of the entire variable-magnification optical system at the telephoto end; and
fw represents a focal length of the entire variable-magnification optical system at the wide-angle end.

17. The image-taking apparatus of claim 15, wherein conditional formula (3) below is fulfilled:

$$0.2 < fl/fm < 1.0 \quad (3)$$

where
fl represents a focal length of the first lens group;

$$fm = \sqrt{fw \times ft}$$

fw represents a focal length of the entire variable-magnification optical system at the wide-angle end; and
ft represents a focal length of the entire variable-magnification optical system at the telephoto end.

18. The image-taking apparatus of claim 16, wherein conditional formula (3) below is fulfilled:

$$0.2 < fl/fm < 1.0 \quad (3)$$

where
fl represents a focal length of the first lens group;

$$fm = \sqrt{fw \times ft} ;$$

fw represents a focal length of the entire variable-magnification optical system at the wide-angle end; and
ft represents a focal length of the entire variable-magnification optical system at the telephoto end.

* * * * *